US011908180B1

(12) United States Patent
Ho et al.

(10) Patent No.: US 11,908,180 B1
(45) Date of Patent: Feb. 20, 2024

(54) GENERATING VIDEOS USING SEQUENCES OF GENERATIVE NEURAL NETWORKS

(71) Applicant: Google LLC, Mountain View, CA (US)

(72) Inventors: Jonathan Ho, New York, NY (US); William Chan, Toronto (CA); Chitwan Saharia, Toronto (CA); Jay Ha Whang, Austin, TX (US); Tim Salimans, Utrecht (NL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/126,281

(22) Filed: Mar. 24, 2023

(51) Int. Cl.
*G06V 10/82* (2022.01)
*G06T 3/40* (2006.01)

(52) U.S. Cl.
CPC ............ *G06V 10/82* (2022.01); *G06T 3/4053* (2013.01)

(58) Field of Classification Search
None
See application file for complete search history.

(56) References Cited

U.S. PATENT DOCUMENTS

2022/0114698 A1* 4/2022 Liu .......................... G06T 7/11

FOREIGN PATENT DOCUMENTS

CN          108596265 A  *  9/2018  ........... G06F 40/289

OTHER PUBLICATIONS

Meng, "On Distillation of Guided Diffusion Models", arXiv:2210.03142v2 [cs.CV] Nov. 30, 2022.*
Yang, "Diffusion Probabilistic Modeling for Video Generation", arXiv:2203.09481v5 [cs.CV] Dec. 8, 2022.*
Luo, "A Comprehensive Survey on Knowledge Distillation of Diffusion Models", arXiv:2304.04262v1 [cs.LG] Apr. 9, 2023.*
Babaeizadeh et al., "Fitvid: Overfitting in pixel-level video prediction," arXiv, Jun. 24, 2021, 25 pages.
Babaeizadeh et al., "Stochastic variational video prediction," arXiv, Mar. 6, 2018, 15 pages.
Bender et al., "On the dangers of stochastic parrots: Can language models be too big?" Proceedings of the 2021 ACM Conference on Fairness, Accountability, and Transparency, Mar. 2021, pp. 610-623.
Birhane et al., "Multimodal datasets: misogyny, pornography, and malignant stereotypes," arXiv, Oct. 5, 2021, 33 pages.
Bordia et al., "Identifying and Reducing Gender Bias in Word-Level Language Models," Proceedings of the 2019 Conference of the North American Chapter of the Association for Computational Linguistics: Student Research Workshop, Jun. 2019, pp. 7-15.
Chen et al., "WaveGrad 2: Iterative Refinement for Text-to-Speech Synthesis," arXiv, Jun. 19, 2021, 5 pages.
Chen et al., "Wave-Grad: Estimating Gradients for Waveform Generation," arXiv, Oct. 9, 2020, 15 pages.
Dhariwal et al., "Diffusion models beat gans on image synthesis," NeurIPS, 2021, 15 pages.

(Continued)

*Primary Examiner* — Jiangeng Sun
(74) *Attorney, Agent, or Firm* — Fish & Richardson P.C.

(57) ABSTRACT

Methods, systems, and apparatus, including computer programs encoded on a computer storage medium. In one aspect, a method includes receiving a text prompt describing a scene; processing the text prompt using a text encoder neural network to generate a contextual embedding of the text prompt; and processing the contextual embedding using a sequence of generative neural networks to generate a final video depicting the scene.

20 Claims, 12 Drawing Sheets

(56) References Cited

OTHER PUBLICATIONS

Ding et al., "Cogview: Mastering text-to-image generation via transformers," NeurIPS, 2021, 14 pages.
Finn et al., "Unsupervised Learning for Physical Interaction through Video Prediction," arXiv, Oct. 17, 2016, 12 pages.
Gupta et al., "Maskvit: Masked visual pre-training for video prediction," arXiv, Aug. 6, 2022, 22 pages.
Harvey et al., "Flexible diffusion modeling of long videos," arXiv, Dec. 15, 2022.
Hessel et al., "Clipscore: A reference-free evaluation metric for image captioning," ar Xiv, Mar. 23, 2022, 15 pages.
Heusel et al., "Gans trained by a two time-scale update rule converge to a local nash equilibrium, " NIPS, 2017, 12 pages.
Ho et al., "Cascaded diffusion models for high fidelity image generation," JMLR, Jan. 2022, 33 pages.
Ho et al., "Classifier-free diffusion guidance," arXiv, Jul. 26, 2022, 14 pages.
Ho et al., "Denoising Diffusion Probabilistic Models," NeurIPS, 2020, 12 pages.
Ho et al., "Progressive distillation for fast sampling of diffusion models," ICLR, Jun. 7, 2022, 21 pages.
Ho et al., "Video diffusion models," arXiv, Jun. 22, 2022, 15 pages.
Kalchbrenner et al., "Video pixel networks," Proceedings of the 34th International Conference on Machine Learning, 2017, 9 pages.
Karras et al., "Elucidating the design space of diffusion-based generative models," arXiv, Oct. 11, 2022, 47 pages.
Kingma et al., "Variational diffusion models," Advances in Neural Information Processing Systems, 2021, 34:21696-21707.
Kong et al., "DiffWave: A Versatile Diffusion Model for Audio Synthesis," arXiv, Mar. 30, 2021, 17 pages.
Kumar et al., "Videoflow: A conditional flow-based model for stochastic video generation," arXiv, Feb. 12, 2020, 18 pages.
Mathieu et al., "Deep multi-scale video prediction beyond mean square error," arXiv, Feb. 26, 2016, 14 pages.
Meng et al., "On distillation of guided diffusion models," arXiv, Nov. 30, 2022, 34 pages.
Nichol et al., "GLIDE: Towards Photorealistic Image Generation and Editing with Text-Guided Diffusion Models," arXiv, Mar. 8, 2022, 20 pages.
Nichol et al., "Improved denoising diffusion probabilistic models," ICML, 2021, 10 pages.
Park et al., "Benchmark for compositional text-to-image synthesis," Thirty-fifth Conference on Neural Information Processing Systems Datasets and Benchmarks Track (Round 1), 2021, 13 pages.
Raffel et al., "Exploring the limits of transfer learning with a unified text-to-text transformer," JMLR, 2020, 21(140):5485-5551.
Ramesh et al., "Hierarchical Text-Conditional Image Generation with CLIP Latent," arXiv, Apr. 13, 2022, 27 pages.
Ranzato et al., "Video (language) modeling: a baseline for generative models of natural videos," arXiv, May 4, 2016, 15 pages.
Rombach et al., "High-Resolution Image Synthesis with Latent Diffusion Models," CVPR, Jun. 2022, 12 pages.
Ronneberger et al., "U-net: Convolutional networks for biomedical image segmentation," International Conference on Medical Image Computing and Computerassisted Intervention, 2015, pp. 234-241.
Saharia et al., "Image super-resolution via iterative refinement," arXiv, Jun. 30, 2021, 28 pages.
Saharia et al., "Palette: Image-to-Image Diffusion Models," SIGGRAPH, Jul. 2022, 10 pages.
Saharia et al., "Photorealistic Text-to-Image Diffusion Models with Deep Language Understanding," NeurIPS, 2022, 16 pages.
Salimans et al., "PixelCNN++: Improving the PixelCNN with discretized logistic mixture likelihood and other modifications," arXiv, Janaury 19, 2017, 10 pages.
Salimans et al., "Progressive Distillation for Fast Sampling of Diffusion Models," arXiv, Jun. 7, 2022, 21 pages.
Shi et al., "Convolutional 1stm network: A machine learning approach for precipitation nowcasting," NIPS, 2015, 9 pages.
Singer et al., "Make-A-Video: Text-to-Video Generation without Text-Video Data," arXiv, Sep. 29, 2022, 13 pages.
Sohl-Dickstein et al., "Deep unsupervised learning using nonequilibrium thermodynamics," Proceedings of the 32nd International Conference on Machine Learning, 2015, pp. 2256-2265.
Song et al., "Denoising diffusion implicit models," arXiv, Oct. 5, 2022, 22 pages.
Song et al., "Generative Modeling by Estimating Gradients of the Data Distribution," NeurIPS, 2019, 13 pages.
Song et al., "Score-based generative modeling through stochastic differential equations," ar Xiv, Feb. 10, 2021, 36 pages.
Tzen et al., "Neural Stochastic Differential Equations: Deep Latent Gaussian Models in the Diffusion Limit," arXiv, Oct. 28, 2019, 18 pages.
Unterthiner et al., "FVD: A new Metric for Video Generation," ICLR 2022 Workshop: Deep Generative Models for Highly Structured Data, 2019, 9 pages.
Vondrick et al., "Generating Videos with Scene Dynamics," arXiv, Oct. 26, 2016, 10 pages.
Whang et al., "Deblurring via Stochastic Refinement," CVPR, Jun. 2022, 11 pages.
Yang et al., "Diffusion Probabilistic Modeling for Video Generation," arXiv, Dec. 8, 2022, 21 pages.
Yu et al., "Scaling Autoregressive Models for Content-Rich Text-to-Image Generation," arXiv, Jun. 22, 2022, 49 pages.

* cited by examiner

102: "Wooden figurine surfing on a surf board."

102: "A British shorthair jumping over a couch."

102: "Coffee pouring in a cup."

102: "Melting pistachio ice cream dripping down a cone."

102: "Origami dancers in white paper, 3D render, ultra-detailed, on white background, studio shot, dancing modern dance."

102: "An astronaut riding a horse."

GENERATING VIDEOS USING SEQUENCES OF GENERATIVE NEURAL NETWORKS

BACKGROUND

This specification relates to processing text prompts to generate videos using sequences of generative neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a video generation system implemented as computer programs on one or more computers in one or more locations that generates a video from a conditioning input using a text encoder neural network and a sequence of generative neural networks. While the description below describes the conditioning input in the form of a text prompt (or a contextual embedding of a text prompt), in other implementations, the conditioning input can be a different type of data, e.g., a noise input sampled from a noise distribution, a pre-existing video, an embedding of a pre-existing video, an image, an embedding of an image, a numeric representation of a desired object category for the video, an audio signal characterizing a scene that the video should depict, an audio signal that includes speech that describes the video, an embedding of an audio signal, combinations thereof, and so on. The methods and systems disclosed herein can be applied to any conditioned video generation problem to generate high definition, temporally consistent videos.

In a first aspect, a method performed by one or more computers is described. The method includes: receiving a text prompt describing a scene; processing the text prompt using a text encoder neural network to generate a contextual embedding of the text prompt; and processing the contextual embedding using a sequence of generative neural networks to generate a final video depicting the scene. The sequence of generative neural networks includes: an initial generative neural network configured to: receive the contextual embedding; and process the contextual embedding to generate, as output, an initial output video having: (i) an initial spatial resolution, and (ii) an initial temporal resolution; and one or more subsequent generative neural networks each configured to: receive a respective input including an input video generated as output by a preceding generative neural network in the sequence; and process the respective input to generate, as output, a respective output video having at least one of: (i) a higher spatial resolution, or (ii) a higher temporal resolution, than the input video.

In some implementations, the respective input of each subsequent generative neural network further includes the contextual embedding.

In some implementations, the one or more subsequent generative neural networks include multiple subsequent generative neural networks, and the respective output video of one or more of the multiple subsequent generative neural networks has one of: (i) a higher spatial resolution, or (ii) a higher temporal resolution, than the input video.

In some implementations, the respective output video of each of the multiple subsequent generative neural networks has one of: (i) a higher spatial resolution, or (ii) a higher temporal resolution, than the input video.

In some implementations, the output videos of the multiple subsequent generative neural networks alternate between having: (i) a higher spatial resolution, and (ii) a higher temporal resolution, than the input videos.

In some implementations, video frames of each output video are generated simultaneously by their respective generative neural network.

In some implementations, the generative neural networks are jointly trained on multiple training examples that each include: (i) a respective input text prompt describing a particular scene, and (ii) a corresponding target video depicting the particular scene, and the text encoder neural network is pre-trained and held frozen during the joint training of the generative neural networks.

In some implementations, the training examples include image-based training examples, the respective target video of each image-based training example includes a respective multiplicity of individual images each depicting a variation of the particular scene described by the respective input text prompt, and jointly training the generative neural networks on the image-based training examples includes masking out any temporal self-attention and temporal convolution implemented by the generative neural networks.

In some implementations, the initial generative neural network implements spatial self-attention and temporal self-attention, and each subsequent generative neural network implements spatial convolution and temporal convolution.

In some implementations, the initial generative neural network further implements spatial convolution, and each subsequent generative neural network that is not a final generative neural network in the sequence further implements spatial self-attention.

In some implementations, each generative neural network in the sequence is a diffusion-based generative neural network.

In some implementations, the diffusion-based generative neural networks are trained using classifier-free guidance.

In some implementations, each diffusion-based generative neural network uses a v-prediction parametrization to generate the respective output video.

In some implementations, each diffusion-based generative neural network further uses progressive distillation to generate the respective output video.

In some implementations, each subsequent generative neural network applies noise conditioning augmentation on the input video.

In some implementations, the final video is the respective output video of a final generative neural network in the sequence.

In some implementations, the initial spatial resolution of the initial output video corresponds to an initial per frame pixel resolution, with higher spatial resolutions corresponding to higher per frame pixel resolutions.

In some implementations, the initial temporal resolution of the initial output video corresponds to an initial framerate of the initial output video, with higher temporal resolutions corresponding to higher framerates.

In a second aspect a system is described. The system includes one or more computers and one or more storage devices storing instructions that, when executed by the one or more computers, cause the one or more computers to perform operations including: receiving a text prompt describing a scene; processing the text prompt using a text encoder neural network to generate a contextual embedding of the text prompt; and processing the contextual embedding using a sequence of generative neural networks to generate a final video depicting the scene. The sequence of generative neural networks includes: an initial generative neural network configured to: receive the contextual embedding; and process the contextual embedding to generate, as output, an initial output video having: (i) an initial spatial resolution, and (ii) an initial temporal resolution; and one or more subsequent generative neural networks each configured to: receive a respective input including an input video generated as output by a preceding generative neural network in the sequence; and process the respective input to generate, as output, a respective output video having at least one of: (i) a higher spatial resolution, or (ii) a higher temporal resolution, than the input video.

In a third aspect, a system is described. The system includes one or more non-transitory computer storage media storing instructions that when executed by one or more computers cause the one or more computers to perform operations including: receiving a text prompt describing a scene; processing the text prompt using a text encoder neural network to generate a contextual embedding of the text prompt; and processing the contextual embedding using a sequence of generative neural networks to generate a final video depicting the scene, wherein the sequence of generative neural networks includes: an initial generative neural network configured to: receive the contextual embedding; and process the contextual embedding to generate, as output, an initial output video having: (i) an initial spatial resolution, and (ii) an initial temporal resolution; and one or more subsequent generative neural networks each configured to: receive a respective input including an input video generated as output by a preceding generative neural network in the sequence; and process the respective input to generate, as output, a respective output video having at least one of: (i) a higher spatial resolution, or (ii) a higher temporal resolution, than the input video.

The subject matter described in this specification can be implemented in particular embodiments so as to realize one or more of the following advantages.

The described video generation system can generate a video with high spatial resolution and high temporal resolution that depicts a scene described by a text prompt. That is, the video generation system can effectively generate a high spatial and temporal resolution video that is accurately captioned by the text prompt. By making use of a sequence (or "cascade") of generative neural networks (GNNs) that can each be conditioned on the text prompt, the system can iteratively up-scale the resolution of the video, ensuring that a high resolution video can be generated without requiring a single neural network to generate the video at the desired output resolution directly. For instance, the sequence of GNNs can progressively refine the pixel resolution of each frame of a video while simultaneously generating new frames between existing frames to gradually increase the framerate.

Cascading GNNs in this manner can significantly improve their sample quality, as well as compensate for any artifacts generated at lower resolutions, e.g., distortions, transients, spectral artifacts, checkerboard artifacts, etc. Compared to still images, such artifacts can be detrimental to the perceptual quality of videos due to their temporal nature. That is, even if each frame of a video has a relatively high spatial resolution and/or perceptual quality individually—when the video is played, any artifacts between frames can be exaggerated as they are generally temporally incoherent. Temporal coherence is closely related to the spectral content of a video and can be understood as a feature-binding mechanism that ensures particular features that evolve together belong to the same object or event. Generating high resolution, temporally coherent videos with few artifacts has been a significant challenge and can be computationally demanding due to the high dimensionality of such problems. The video generation system implementing a sequence of GNNs provides a solution to these problems. In particular, the sequence of GNNs can model high dimensional video generation problems while keeping each individual GNN relatively simple.

Owing to the modular nature of the system, this iterative up-scaling procedure can be used to generate arbitrary length videos with any desired resolution. The system can utilize any suitable number of GNNs each implementing any suitable type of generative model and each having any suitable number of neural network layers, network parameters and/or hyperparameters to generate a video with a desired length and resolution. Besides the performance improvements at inference, the modularity of the system also realizes significant gains during training. For example, a training engine can jointly train the sequence of GNNs in parallel which facilitates a high degree of optimization and reduction in training times. That is, each GNN in the sequence can be independently optimized by the training engine to impart certain properties to the GNN, e.g., particular spatial and/or temporal resolutions, frame fidelity, perceptual quality, efficient decoding (or denoising), fast sampling, reduced artifacts, etc.

To provide high fidelity text-to-video generation, the system can use a pre-trained text encoder neural network to process a text prompt and generate a contextual embedding of the text prompt. The text prompt can describe a scene (e.g., as a sequence of tokens in a natural language) and the contextual embedding can represent the scene in a computationally amendable form (e.g., as a set or vector of numeric values, alphanumeric values, symbols, or other encoded representation). The training engine can also hold the text encoder frozen when the sequence of GNNs is trained to improve alignment between text prompts and videos generated at inference. A frozen text encoder can be particularly effective because it can enable the system to learn deep language encodings of scenes that may otherwise be infeasible if the text encoder were trained in parallel, e.g., due to the text encoder being biased on the particular scenes described by text-video training pairs. Furthermore, text-based training sets are generally more plentiful and sophisticated than currently available text-video or text-image training sets which allows the text encoder to be pre-trained and thereafter implemented in a highly optimized fashion. See, for example, T5 text encoders provided by Colin Raffel et al., "Exploring the Limits of Transfer Learning with a Unified Text-to-Text Transformer. *JMLR,* 21(140), 2020." Freezing the text encoder has several other advantages such as offline computation of contextual embeddings, resulting in negligible computation or memory footprint during training.

The system can process the contextual embedding using the sequence of GNNs to generate a final video depicting the scene that is described by the text prompt. In particular, an initial GNN can receive the contextual embedding. The initial GNN can process the contextual embedding to generate an initial output video having an initial spatial resolution and an initial temporal resolution. For example, the initial video can be generated by the initial GNN at a relatively low spatial and temporal resolution. The initial video can be continually processed by each subsequent GNN in the sequence to generate respective output videos with increasing spatial and/or temporal resolution until a final video, having a desired final resolution, is obtained. In particular, each subsequent GNN can receive an input video, which was generated as output by a preceding GNN in the sequence, and process the input video to generate a respective output video having a higher spatial resolution and/or a higher temporal resolution than the input video. For instance, the system can use a base video generation model for the initial GNN and interleaved spatial super-resolution (SSR) and temporal super-resolution (TSR) models for the subsequent GNNs that alternate between increasing spatial resolution and increasing temporal resolution of output videos relative input videos. The system can also use joint spatial-temporal super resolution (STSR) models for the subsequent GNNs that increase both the spatial and the temporal resolution of output videos relative input videos.

Each GNN in the sequence of GNNs can have any appropriate neural network architecture that enables it to perform its described function, i.e., processing a contextual embedding of a text prompt and/or an input video to generate a respective output video. In particular, a GNN can include any appropriate types of neural network layers (e.g., fully-connected layers, convolutional layers, self-attention layers, etc.) in any appropriate numbers (e.g., 5 layers, 25 layers, or 100 layers) and connected in any appropriate configuration (e.g., as a linear sequence of layers).

In some implementations, the video generation system uses diffusion-based models for each of the GNNs, although any combination of generative models can be utilized by the system, e.g., variational auto-encoders (VAEs), generative adversarial networks (GANs), etc. Diffusion models can be particularly effective in the modular setting of the system due to their controllability and scalability. For example, compared to some generative models, diffusion models can be efficiently trained by the training engine on computationally tractable objective functions with respect to a given training set. These objective functions can be straightforwardly optimized by the training engine to increase the speed and performance of diffusion-based GNNs (DBGNNs), as well as enable techniques such as classifier-free guidance and progressive distillation which further improve performance.

Among other aspects, this specification describes a methodology to scale up a video generation system as a high definition text-to-video model including design decisions such as the choice of fully-convolutional TSR models and spatial SSR models for GNNs at certain resolutions. For DBGNNs, v-parametrizations can be implemented by the system for stability and to facilitate progressive distillation in combination with classifier-free guidance for fast, high quality sampling. The video generation system is not only capable of generating videos with high fidelity, but also has a high degree of controllability and world knowledge, including the ability to generate diverse videos and text animations in various artistic styles and with three-dimensional (3D) object understanding.

The video generation system described in this specification can be implemented in any appropriate location, e.g., on a user device (e.g., a mobile device), or on one or more computers in a data center, etc. The modularity of the video generation system allows multiple devices to implement individual components of the system separately from one another. Particularly, different GNNs in the sequence can be executed on different devices and can transmit their outputs and/or inputs to one another (e.g., via telecommunications).

As one example, the text encoder and a subset of the GNNs may be implemented on a client device (e.g., a mobile device) and the remainder of the GNNs may be implemented on a remote device (e.g., in a data center). The client device can receive an input (e.g., a text prompt) and process the text prompt using the text encoder and the subset of GNNs to generate an output video with a particular resolution. The client device can then transmit its outputs (e.g., the output video and a contextual embedding of the text prompt) which is received at the remote device as input. The remote device can then process the input using the remainder of the GNNs to generate a final output video having a higher resolution than the output video.

Users can interact with the video generation system, e.g., by providing an inputs to the video generation system by way of an interface, e.g., a graphical user interface, or an application programming interface (API). In particular, a user can provide an input that includes: (i) a request to generate a video, and (ii) a prompt (e.g., a text prompt) describing the contents of the video to be generated. In response to receiving the input, the video generation system can generate a video responsive to the request, and provide the video to the user, e.g., for display on a user device of the user, or for storage in a data storage device. In some cases, the video generation system can transmit a generated video to a user device of the user, e.g., by way of a data communication network, e.g., the internet.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

Figure 1A:
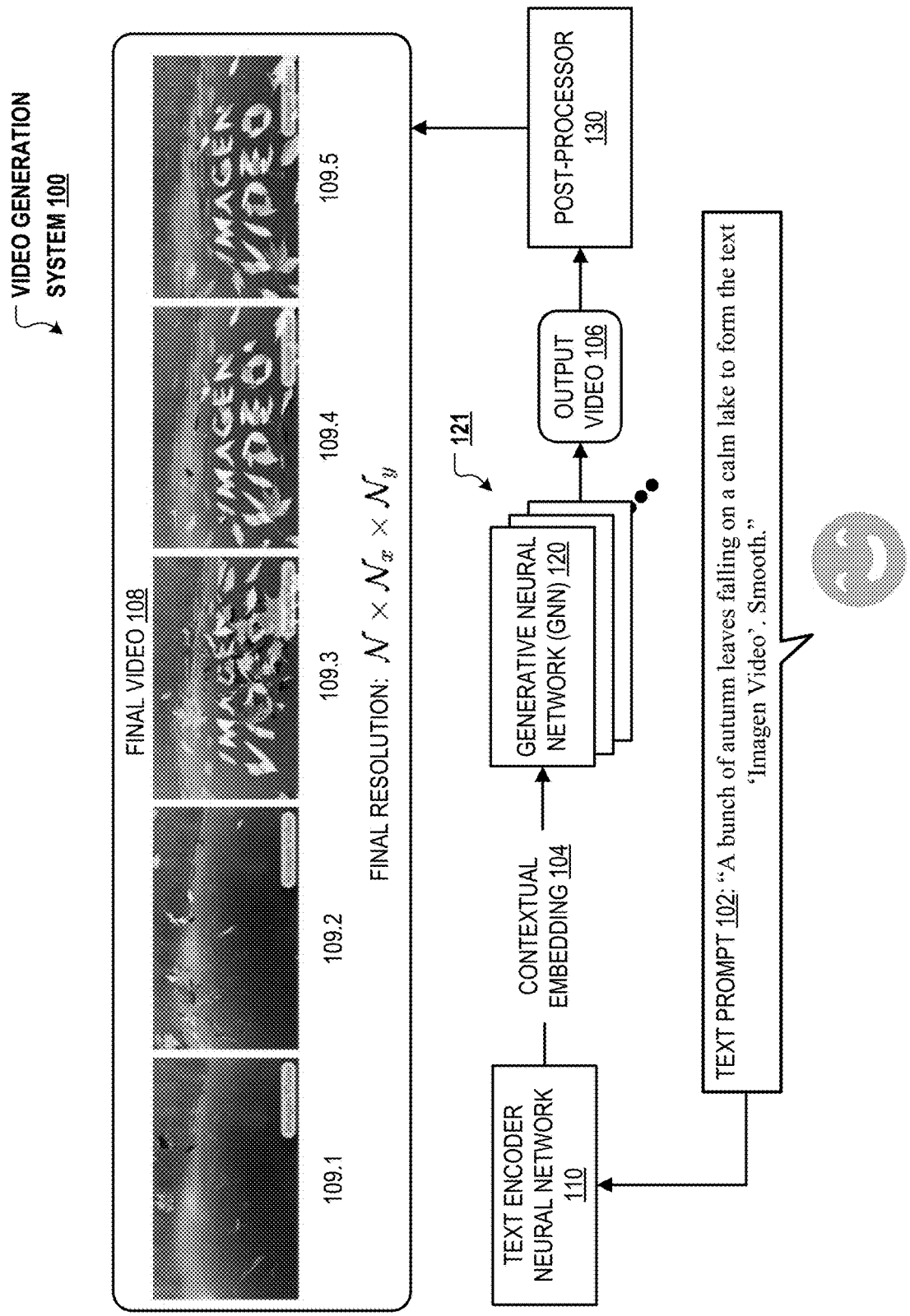
FIG. 1A shows a block diagram of an example video generation system that can generate videos from text prompts.

Generative modeling has made considerable progress with recent text-to-image systems. Diffusion-based models in particular have found success in multiple generative modeling tasks including density estimation, text-to-speech, image-to-image, and text-to-image problems. The video generation system disclosed in this specification is generally directed at text-to-video problems which have seen less attention due to the difficulty generating dynamic, temporally coherent scenes with few artifacts—a considerable challenge compared to still image generation. The video generation system is capable of processing received text prompts to generate high definition videos with high frame fidelity, strong temporal consistency, and deep language understanding.

Examples of the video generation system also demonstrate a number of advantages and insights related to generative video modeling and generative modeling as a whole, including, but not limited to:

1. The straightforwardness and effectiveness of a sequence or "cascade" of generative neural networks (e.g., diffusion-based models) for high definition video generation.
2. The effectiveness of frozen encoder text conditioning and classifier-free guidance in diffusion-based models.
3. The effectiveness of the v-prediction parameterization for sample quality and the effectiveness of progressive distillation of guided diffusion models in the text-conditioned video generation setting.
4. The qualitative controllability of the example systems, such as three-dimensional (3D) object understanding, generation of text animations, and generation of videos in various artistic styles.

As is described below, the video generation system uses a sequence of generative neural networks (GNNs) to progressively increase the resolution of a video, i.e., the spatial resolution, the temporal resolution, or both.

As used herein, the term "scene" generally refers to any collection of one or more objects or generic "things" that may or may not be interacting or evolving in some way. For example, a scene may include multiple objects interacting with one another in an environment, e.g., "A wooden figurine surfing on a surfboard in space". A scene may include a single stationary object without a background or backdrop, or with a single color background or backdrop, e.g., "Studio shot of minimal kinetic sculpture made from thin wire shaped like a bird on white background". A scene may include text animations or abstract motion of art such as colors, shapes, lines, and so on, e.g., "A blue flame transforming into the text "Imagen". Smooth animation". As shown in FIGS. 7A-7F the types of scenes that can be depicted in videos and described by text prompts is diverse and can span from real-world settings to abstract.

When referring to a video, the term "spatial resolution" generally refers to how close lines in the video can be to each other and still be visibly resolved. That is, how close two lines can be to each other without them appearing as a single line in the video. In some implementations, the spatial resolution can be identified with the per frame pixel resolution which, in this case, corresponds to the number of independent pixels per unit length (or per unit area) for each video frame—not necessarily the total number of pixels per unit length (or per unit area) for each video frame. In particular, a first video can have a higher pixel count per frame than a second video but is still of worse spatial resolution than the second video. For example, naively up-sampling the pixels of each frame of a video increases the pixel count per frame but does not increase the spatial resolution. Generally, a relative length scale is also assumed to have a definite comparison of spatial resolution between videos. For example, a digital video with 2048×1536 independent pixels per frame may appear as low resolution (~72 pixels per inch (ppi)) if viewed at 28.5 inches wide, but may appear as high resolution (~300 ppi) if viewed at 7 inches wide. The relative length scale generally refers to the length scale at which the video is viewed (e.g., on a display), not necessarily the length scale of a scene depicted in the video. For example, a video depicting planetary motion and a video depicting atomic motion can have different length scales in their respective scenes but the same relative length scale when viewed.

When referring to a video, the term "temporal resolution" generally refers to how close different events can occur in the video while still being resolvable. That is, how close two events can occur without them appearing to occur simultaneously in the video. In some implementations, the temporal resolution can be identified with the framerate which, in this case, corresponds to the number of independent video frames per unit time—not necessarily the total number of video frames per unit time. In particular, a first video can have a higher frame count than a second video but is till of worse temporal resolution than the second video. For example, naively up-sampling the frames of a video increases the frame count but does not increase the temporal resolution. Generally, a relative time scale is also assumed to have a definite comparison of temporal resolution between videos. For example, a digital video with 240 independent frames may appear as low resolution (~4 frames per second (fps)) if viewed over 60 seconds, but may appear as high resolution (~24 fps) if viewed over 10 seconds. The relative time scale generally refers to the time scale at which the video is viewed (e.g., on a display), not necessarily the time scale of a scene depicted in the video. For example, a video depicting a slow motion replay of a football play and a video depicting a time lapse of a seed growing can have different time scales in their respective scenes but the same relative time scale when viewed.

The video generation system disclosed herein can increase the number of independent pixels per frame and the number of independent frames of a video (e.g., using non-linear layers), thereby increasing the spatial and temporal resolution of the video. The system can accomplish this in a manner that is spatially and temporally coherent (e.g., using spatial and temporal self-attention layers and/or convolutional layers), such that there are little or no visible artifacts within a frame and between frames. For reference, spatial coherence generally describes coherence within a single frame of a video, while temporal coherence generally describes coherence over every frame of the video. Maintaining temporal coherence over the length of a generated video is one of the significant problems afflicting currently available techniques (e.g., auto-regressive techniques)—a problem that this is solved by the video generation system disclosed in this specification.

This specification is organized as follows. Section I describes an overview of the video generation system. Section II describes generative neural networks for use in conditioned video generation. Section III describes diffusion-based generative neural networks for use in conditioned video generation. Section IV describes conditioned video generation from text using a sequence of generative neural networks. Section V describes jointly training a sequence of generative neural networks on text-video training sets. Section VI describes different generative neural network architectures. Section VII describes other applications of the video generation system (e.g., noise-to-video generation) and applications beyond video generation (e.g., sequence data generation).

I. Overview of Video Generation System

FIG. 1A shows a block diagram of an example video generation system 100. The video generation system 100 is an example of a system implemented as computer programs on one or more computers in one or more locations in which the systems, components, and techniques described below are implemented.

At a high-level, the video generation system 100 includes a text encoder neural network 110, a sequence of generative neural networks (GNNs) 121 and, in some implementations, a post-processor 130. The system 100 is configured to receive text prompts 102 as input and to generate final videos 108 as output.

More particularly, the system 100 can receive a text prompt (T) 102 describing a scene. The text prompt 102 can be a text sequence that includes multiple tokens $T_{1,2\ldots}$ in a natural language $T=(T_1, T_2, \ldots)$. For example, as shown in FIG. 1A, the text prompt 102 can include: "A bunch of autumn leaves falling on a calm lake to form the text 'Imagen Video'. Smooth." In general, the text prompt 102 can describe any particular scene and the system 100, when appropriately trained (e.g., by a training engine), is capable of generating high resolution videos that faithfully depict the scene. The text prompt 102 can also include text modifiers such as "Smooth", "Studio lighting", "Pixel art", "in the style of Van Gough", etc. that impart various styles, modifications and/or characteristics on final videos 108 generated by the system 100. The system 100 can generate various different types of videos such as photorealistic videos, cartoon videos, abstract visualizations, imaging videos of different modalities, among others. For example, the system 100 can generate medical videos, e.g., videos depicting a sequence of MRI, CT or ultrasound video frames.

The text encoder 110 is configured to process the text prompt 102 to generate a contextual embedding (u) of the text prompt 102. In some implementations, the text encoder 110 is a pre-trained natural language text encoder, e.g., a T5 text encoder such as T5-XXL, a CLIP text encoder, among others. The contextual embedding 104 can also be referred to as an encoded representation of the text prompt 102 that provides a computationally amenable representation for processing by the system 100. For example, the contextual embedding 104 can be a set, vector, or array of values (e.g., in UNICODE or Base64 encoding), alphanumeric values, symbols, or any convenient encoding.

The sequence of GNNs 121 includes multiple GNNs 120 that are each configured to receive a respective input (c). Each GNN 120 is configured to process their respective input to generate a respective output video (x). In general, the sequence 121 includes an initial GNN that generates an initial output video (e.g., at low resolution) and one or more subsequent GNNs that progressively refine the resolution of the initial output video, i.e., the spatial resolution, the temporal resolution, or both. For example, each subsequent GNN can be a spatial super-resolution (SSR) model to increase spatial resolution, a temporal super-resolution (TSR) model to increase temporal resolution, or a joint spatial-temporal super-resolution (STSR) model to increase both spatial and temporal resolution. Accordingly, the respective input for the initial GNN includes the contextual embedding 104, while the respective input for each subsequent GNN includes the output video generated by a preceding GNN in the sequence 121. In some cases, the respective input to each subsequent GNN may include one or more output videos generated at lower depth in the sequence 121, as opposed to only the preceding GNN. Such cases are not described in detail but can be realized using the techniques outlined herein. In some implementations, the respective input for each subsequent GNN also includes the contextual embedding 104 which generally improves performance of the system 100, e.g., such that each subsequent GNN generates a respective output video that is strongly conditioned on the text prompt 102. The system 100 processes the contextual embedding 104 through the sequence 121 to generate an output video 106 at a high resolution, with few (if any) artifacts. The output video 106 is usually the respective output video of a final GNN in the sequence 121 but can, in principle, be provided by any GNN 120 in the sequence 121.

In some implementations, the output video 106 is further processed by the post-processor 130 to generate a final video (x) 108. For example, the post-processor 130 can perform transformations on the output video 106 such as video enhancement, motion blur, filtering, transitions, luminance, lens flare, warp stabilization, de-shaking, brightening, sharpening, contrast, among other video effects. Some or all of the transformations performed by the post-processor 130 may also be performed by the sequence 121 when the GNNs 120 are suitably trained (e.g., by a training engine). For example, the GNNs 120 can learn these transformations and associate them with respective text modifiers included in text prompts 102. In some implementations, the system 100 does not include the post-processor 130 and the output video 106 generated by the sequence 121 is the final video 108. Alternatively, system 100 can disable the post-processor 130 such that transformations performed on the output video 106 by the post-processor 130 are equivalent to the identity operation.

In some implementations, the post-processor 130 may perform analysis on the output video 106 such as video classification and/or video quality analysis. The post-processor 130 may include one or more neural networks such as a convolutional neural network (CNN), a recurrent neural network (RNN), or a video encoder to perform such analysis. For example, the post-processor 130 can determine if the output video 106 accurately depicts the scene described by the text prompt 102 by encoding the output video 106 into a video embedding and comparing it with the contextual embedding 104. In these cases, the post-processor 130 may include a video encoder that is paired with the text encoder 110, such as pre-trained text-video encoder pair (similar to a CLIP text-image encoder pair). This also presents a means of zero-shot (or semi-supervised) training of the sequence 121 by comparing video embeddings with contextual embeddings 104. In other words, the sequence 121 may be trained (e.g., by a training engine) to generate output videos 106 from text-based training sets (as opposed to only labelled text-video training sets) by generating output videos 106 that faithfully reconstruct contextual embeddings 104 once encoded into video embeddings. As another example, the post-processor 130 can determine if the output video 106 has high resolution, temporal consistency, few artifacts, etc. using a CNN and/or a RNN that quantify spatial and/or temporal coherence, as well as using traditional objective video quality models.

The final video 108 depicts the scene described by the text prompt 102 and is output by the system 100 with a final resolution $R=N \times N_x \times N_y$. For example, as shown in FIG. 1A, the final video 108 (represented by sample frames 109.1-5) depicts a bunch of autumn leaves falling on a calm lake to form the text 'Imagen Video'. Accordingly, the final video 108 is accurately captioned by the corresponding text prompt 102 in FIG. 1A. FIGS. 7A-7F show other examples of videos that can be generated from text prompts by the video generation system 100.

The final resolution R corresponds to the final temporal resolution N multiplied by the final spatial resolution $N_x \times N_y$, and is a measure of the information content of the video 108, i.e., the dimensionality of the video 108. As mentioned above, temporal resolution can correspond to a framerate, i.e., a number of independent frames N over a pre-defined period of time. In this case, the final video $\hat{x}=(x_1, x_2, \ldots, x_N)$ includes multiple frames, with more (independent) frames providing higher temporal resolution. Also mentioned above, spatial resolution can correspond to a per frame pixel resolution, i.e., a number of independent pixels per frame $N_{xy}=N_x \times N_y$ over pre-defined lengths (or a pre-defined area). In this case, each frame $x_{1,2,\ldots,N}$ can include a respective $N_x \times N_y$ sized array of pixel values (e.g., corresponding to RGB color codes), with more (independent) pixels providing higher spatial resolution. Hence, the number of independent frames N multiplied by the number of independent pixels per frame $N_x \times N_y$ provides the final resolution R and total dimension of the final video 108. In most cases, the final resolution R of the final video 108 is equal to the resolution R of the output video 106, but these may differ in some implementations (e.g., if the post-processor 130 resizes the output video 106).

For reference, the example videos depicted in FIG. 1A and FIGS. 7A-7F were generated at a spatial resolution of $N_x \times N_y=1280 \times 768$ and a temporal resolution of N=128 corresponding to R≈126 million total pixels, which can be viewed at a framerate of 24 fps for approximately 5.3 seconds. The example videos were generated by a video generation system implementing a sequence of seven diffusion-based GNNs (DBGNNs) that includes an initial DBGNN employing a base video generation model and six subsequent DBGNNs employing three SSR models interleaved with three TSR models (see FIGS. 4A and 5B for example). The seven DBGNNs have a combined total of 11.6 billion diffusion model parameters.

Figure 1B:
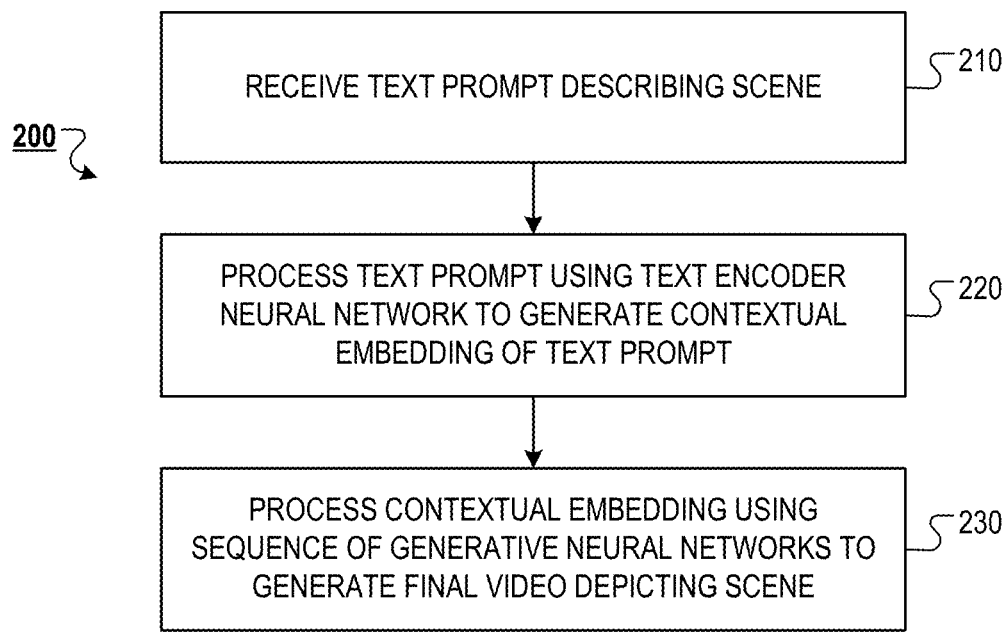
FIG. 1B is a flow diagram of an example process for generating a video from a text prompt.

FIG. 1B is a flow diagram of an example process 200 for generating a final video depicting a scene that is described by a text prompt. For convenience, the process 200 will be described as being performed by a system of one or more computers located in one or more locations. For example, a video generation system, e.g., the video generation system 100 of FIG. 1A, appropriately programmed in accordance with this specification, can perform the process 200.

The system receives a text prompt describing a scene (210).

The system processes the text prompt using a text encoder neural network to generate a contextual embedding of the text prompt (220).

The system processes the contextual embedding using a sequence of generative neural networks to generate a final video depicting the scene (230).

II. Generative Neural Networks (GNNs)

In general, the sequence 121 can utilize any of multiple types of generative models for the GNNs 120. Such generative models include, but are not limited to, diffusion-based models, generative adversarial networks (GANs), variational auto-encoders (VAEs), auto-regressive models, energy-based models, Bayesian networks, flow-based models, hierarchal versions of any of these models (e.g., continuous or discrete time), among others. Section II provides a methodology for using generic GNNs to generate output videos from a conditioning input, followed by Section III describing diffusion-based GNNs (DBGNNs).

Broadly speaking, the goal of the sequence 121 is to generate new instances of high definition videos with a high degree of controllability, i.e., that are strongly conditioned on a conditioning input (e.g., text prompts). As explained in Section I, each GNN 120 in the sequence 121 processes a respective conditioning input c to generate a respective output video $\hat{x}$, where the respective input c includes a contextual embedding (u) of a text prompt and/or an output video generated by a preceding GNN in the sequence 121. That being said, the contextual embedding 104 can also be substituted with a different conditioning input such as a noise input, a pre-existing video, an image, an audio waveform, embeddings of any of these, combinations thereof, etc. Although this specification is generally concerned with text-to-video generation, the video generation systems disclosed herein is not limited to such. The video generation systems can be applied to any conditioned video generation problem by changing the conditioning input into the sequence 121. An example of such an implementation is described in Section VII which outlines generating videos from noise.

In the context of the sequence 121, the ability to generate conditioned videos at multiple resolutions can be advantageous as it allows the sequence 121 to learn at multiple different spatial and temporal scales, while keeping each individual GNN relatively simple. This can be particularly significant with respect to maintaining temporal coherence in output videos since events that evolve over different time scales can be captured at different stages in the sequence 121. For example, the joint distribution of a sequence 121 including an (i=0) initial GNN and (i=1,2, . . . , n) subsequent GNNs can be expressed as a Markovian chain:

$$p_\theta(x^{(n)}, x^{(n-1)}, x^{(n-2)}, \ldots, x^{(0)}|U) = p_\theta(x^{(n)}|x^{(n-1)}, u) \ldots$$
$$p_\theta(x^{(n-1)}|x^{(n-2)}, u) \ldots p_\theta(x^{(0)}|u) = p_\theta(x^{(n)}|c^{(n)})$$
$$p_\theta(x^{(n-1)}|c^{(n-1)}) \ldots p_\theta(x^{(0)}|c^{(0)}) = {}_{i=0}\Pi^n p_\theta(x^{(i)}|c^{(i)})$$

Where $x^{(i)}$ corresponds to videos of a particular resolution $R^{(i)}$, with $R^{(i)} > R^{(i-1)}$, and $p_\theta(x^{(i)}|c^{(i)})$ is the respective likelihood distribution of a particular GNN 120 conditioned on $c^{(i)}=(x^{(i-1)}, u)$. Compare this with a single GNN generating videos directly to the highest resolution $p_\theta(x^{(n)}|u)$. The amount of data that a single GNN learns from can be orders of magnitude smaller than a sequence of GNNs 121. Moreover, as explained in Section V, the sequence 121 allows data associated with each resolution to be learned in parallel. For brevity, the superscript (i) identifying a particular GNN 120 is dropped unless otherwise pertinent.

To generate strongly conditioned output videos, a GNN 120 can parametrize its likelihood distribution $p_\theta(x|c)$ as one that maximizes the conditional probability of corresponding pairs (x, c) of data, e.g., data derived from one or more text-video training sets. In other words, the GNN 120 can implement a parametrization that maximizes the probability of a target output video $\hat{x}$ given a corresponding training input c, or at least optimizes some objective function $L_\theta(x, c)$ that depends on the training data (x, c). Here, θ is the respective set of network parameters of the GNN 120 that dictates the functional form of the likelihood distribution. For clarity, output videos actually generated by a GNN 120 have a hat symbol $\hat{x}$ which denotes that videos x are "estimated" by $\hat{x}$. As is described in more detail below, a GNN 120 can generate estimates $\hat{x}$ in a variety of ways depending on the implementation.

A GNN 120 facilitates a likelihood parametrization by modelling intermediate distributions over latent representations z of videos x, a.k.a., embeddings, encodings, or "labels" of videos. For example, the latents z can be used by the GNN 120 to generate particular types of videos as identified by particular conditioning inputs c. The latent spaces can also provide the GNNs 120 a means of combining, mixing, and compressing information from different videos such that the sequence 121 can generate new instances of videos that are ostensibly unlike anything appearing in the training sets.

First consider moving to the latent space. To wit, marginalizing the likelihood $p_\theta(x|c)$ over the latent representations z provides the integral relation:

$$p_\theta(x|c) = \int p_\theta(x,z|c)dz$$

$p_\theta(x, z|c)$ is the joint distribution of x and z conditioned on c. In most cases, the dimension of the latent representations z is less than or equal to the dimension of the corresponding videos x, i.e., the resolution $R=N \times N_x \times N_y$ of the videos, which enables a compressed representation of the videos. Using the chain-rule, the joint distribution can be expressed as:

$$p_\theta(x,z|c) = p_\theta(x|z,c)p_\theta(z|c)$$

$p_\theta(z|c)$ is the prior distribution of z given c, while $p_\theta(x, z|c)$ is the conditional distribution of x given z and c. The conditional distribution allows a GNN 120 to invert videos x given their latent representations z, while the prior distribution allows a GNN 120 to realize a generative model of the latent representations themselves. Modelling the prior distribution can be advantageous, for example, when a GNN 120 seeks to correlate conditioning inputs c strongly with latent representations z, such that $p_\theta(z|c)$ is highly localized around c. A GNN 120 can model various different prior distributions such as autoregressive priors, diffusion priors, normal distributions, among others.

Accordingly, to generate an output video $\hat{x}$, a GNN 120 can process a conditioning input c and sample a latent from the prior distribution $z \sim p_\theta(z|c)$. The GNN 120 can then process the latent z to generate the output video $\hat{x}$ from the conditional distribution $p_\theta(x|z, c)$, which is generally associated with the video types as specified by c. The GNN 120 can generate the output video $\hat{x}$ from the conditional distribution in many different ways. For example, the GNN 120 can sample a video from the conditional distribution:

$$\hat{x} \sim p_\theta(x|Z,c),$$

return the mean of the conditional distribution:

$$\hat{x} = E_{x \sim p_\theta(x|z,c)}[x] = \int x p_\theta(x|z,c)dx,$$

return the video with the highest probability:

$$\hat{x} = \arg\max\, p_\theta(x|z,c), x$$

use an algorithm to choose from multiple high-probability videos and/or multiple samples of videos, and so on. Since an output video $\hat{x}=\hat{x}(\theta, z, c)$ is generally a function of the network parameters $\theta$, the sampled latent z, and the conditioning input c, a GNN 120 is capable of generating new instances of videos that are strongly correlated with c. Particularly, the GNN 120 can implement a parametrization $\theta$ that efficiently decodes randomly sampled latents z into videos x based on the input c. Hence, the video generation process at each stage of the sequence 121 can be understood as a conditioned decoding process.

In some implementations, a GNN 120 may model the prior distribution as a standard normal distribution $p_\theta(z|c) = p(z) = N(z; 0, I)$ and the conditional distribution as a normal distribution $p_\theta(x|z, c) = N(x; \mu_\theta(z, c), \sigma_\theta^2(z, c)I)$, where $\mu_\theta(z, c)$ and $\sigma_\theta^2(z, c)$ are the mean and variance, respectively, as a function of z and c. In this case, the GNN 120 can generate the mean and/or variance of the conditional distribution as output and then determine an output video $\hat{x}$ from the mean and/or variance. As explained in Section VI, this facilitates straightforward neural network architectures (e.g., super-resolution models) since the GNN 120 can generate $\hat{x}$ deterministically from z and c, without modelling the prior distribution or directly referencing the conditional distribution. Moreover, this parametrization enables optimization of stochastic terms (e.g., via gradient descent methods) that would otherwise be non-differentiable. For example, after using the re-parametrization trick, a sample from the conditional distribution is equivalent to $\hat{x}=\mu_\theta(z, c)+\sigma_\theta(z, c) \odot \epsilon$, where $\epsilon \sim N(0, I)$ and $\odot$ represents the element-wise product. As another example, returning the mean of the conditional distribution amounts to $\hat{x}=\mu_\theta(z, c)$. Hence, the GNN 120 can be realized, at least in part, as a neural network that takes z and c as input and generates $\mu_\theta(z, c)$ and/or $\sigma_\theta(z, c)$ as output.

The particular form of the conditional and prior distributions generally depends on the generative model implemented by a particular GNN 120 as well as its assumptions, architecture, parametrization and training regime. For example, the type of objective functions $L_\theta(x, c)$, the type and amount of training sets, and the statistics of the training sets can affect the convergence of a particular model. In any case, a training engine can use an expectation-maximization (EM) algorithm to maximize the likelihood $p_\theta(x|c)$ of a GNN 120 with respect to its network parameters $\theta$ to determine the conditional and/or prior distributions.

That being said, EM algorithms and certain objective functions $L_\theta(x, c)$ can be computationally intractable in some cases, e.g., when the training engine uses considerably large training sets, the prior and/or conditional distributions are particularly complex, etc. In these cases, the training engine can simultaneously model posterior distributions $q_\phi(z|x, c)$ over the latent representations which can speed up the calculus during training, e.g., when the training engine maximizes the evidence lower bound (ELBO). The posterior distribution describes how data (x, c) is encoded into latent representations z. Here, $\phi$ is another set of network parameters that can be included in a respective GNN 120 or another neural network, e.g., a discriminative neural network (DNN). A GNN 120 can sample from the posterior distribution instead of the prior distribution during training, which can significantly reduce the number of latents z needed to converge to a suitable parameterization $\theta$, e.g., when the training engine simultaneously optimizes an objective function $L_{\theta\phi}((x, c)$ with respect to $\theta$ and $\phi$. After training, the GNN 120 can continue sampling from the prior distribution. In some implementations, the training engine can model the posterior distribution as a normal distribution $q_\phi(z|x, c) = N(z; \mu_\phi(x, c), \sigma_\phi^2(x, c)I)$, where $\mu_\phi((x, c)$ and $\sigma_\phi^2(x, c)$ are the mean and variance, respectively, as a function of x and c. As mentioned above with respect to the conditional distribution, a parametrization of this form can aid in optimizing stochastic terms (e.g., using gradient descent methods) that would otherwise be non-differentiable. For reference, the conditional distribution $p_\theta(x|z, c)$ in combination with the posterior distribution $q_\phi(z|x, c)$ is usually referred to as a variational auto-encoder (VAE), with $\theta$ being the decoder parameters and $\phi$ being the encoder parameters.

In some implementations, the GNNs 120 use noise conditioning augmentation during video generation and/or training. In particular, each subsequent GNN in the sequence 121 can apply noise conditioning augmentation to their corresponding input video. This can help facilitate parallel training of different GNNs 120 in the sequence 121, as it reduces the sensitivity to domain gaps between the output video of one stage of the sequence 121 and the inputs used in training the subsequent stage. For example, a GNN 120 can apply Gaussian noise augmentation (e.g., Gaussian noise and/or blur) with a random signal-to-noise ratio to its input video during training. At interference time, the GNN 120 can use a fixed signal-to-noise ratio (e.g., about 3 to 5), representing a small amount of augmentation, which aids in removing artifacts in the output video from the previous stage while preserving most of the structure.

III. Diffusion-Based Generative Neural Networks (DBGNNs)

Examples of diffusion-based GNNs (DBGNNs) 120 are described below that can generate strongly conditioned output videos from latent representations. Diffusion models generally come in two flavors: (i) discrete time hierarchies, and (ii) continuous time hierarchies. Either approach can be implemented by the GNNs 120. However, it has been shown by Diederik Kingma, et al., "Variational diffusion models," *Advances in neural information processing systems* 34 (2021): 21696-21707, that continuous time diffusion models typically lead to less error than discrete time versions. For example, continuous time diffusion models generally have an improved evidence lower bound (ELBO) than discrete time versions.

In continuous time, the latent representations are parametrized by a continuous time index $z=\{z_t | t \in [0,1]\}$. The forward (encoding) process is described by the posterior distribution $q_\phi(p(z|x, c)$ which starts with data $(x, c)$ at $t=0$ and ends with standard Gaussian noise at $t=1$. The posterior distribution can be expressed as:

$$q_\phi(z|x,c)=q(z|x)=q(z_s,z_t|x)=q(z_t|z_s)q(z_s|x)$$

$0 \leq s < t \leq 1$ is a truncated continuous time interval. $q(z_t|x)$ is the (forward) prior distribution of $z_t$ given x which describes how a DBGNN 120 encodes videos into latent representations. $q(z_t|z_s)$ is the forward transition distribution from $z_s$ to $z_t$ which describes how a DBGNN 120 determines a new latent $z_t$ from $z_s$ for times $t>s$. For a DBGNN 120, the forward distributions are typically assumed independent of p and c. In other words, the forward (encoding) process is usually not learned by the DBGNN 120 and can be described in terms of linear Gaussians:

$$q(z_t|x)=N(z_t;\alpha_t x, \sigma_t^2 I), q(z_t|z_s)=J(z_t;(\alpha_t/\alpha_s)z_s, \sigma_{t|s}^2 I)$$

$\sigma_{t|s}^2 = [1-\exp(\lambda_t - \lambda_s)]\sigma_t^2$ is the variance of the forward transition distribution. The parameters $\alpha_t$ and $\sigma_t$ specify a noise schedule whose log signal-to-noise ratio $\lambda_t = \log(\alpha_t^2/\sigma_t^2)$ decreases monotonically with t until the forward prior distribution converges to a standard normal distribution $q(z_1|x)=q(z_1)=N(z_1; 0, I)$ at a time of $t=1$. Any noise schedule can be implemented by a DBGNN 120, such as linear, polynomial, or cosine noise scheduling, among others.

In some implementations, the DBGNNs 120 use cosine noise scheduling (e.g., with at $=\cos(0.5 \pi t)$) which can be particularly effective at producing high quality samples. A discussion on different noise schedules is provided by Alexander Quinn Nichol and Prafulla Dhariwal, "Improved denoising diffusion probabilistic models," *International Conference on Machine Learning, PMLR,* 2021. In other implementations, the DBGNNs 120 can learn a noise schedule as opposed to assuming one, e.g., by parametrizing the variance $\sigma_t^2 = \sigma_\phi^2(t, c)$. In this implementation the forward process is a learned model. In any implementation, the DBGNNs 120 may utilize a variance preserving noise schedule $\sigma_t^2 = 1 - \alpha_t^2$ such that the variance of the latents remain at a similar scale over all t.

A DBGNN 120 learns the generative model by matching the forward process in the reverse time direction, generating $z_t$ starting from $t=1$ and ending at $t=0$. Learning the generative model can be reduced to learning to denoise $z_t \sim q(z_t|x)$ into an estimate $\hat{x}_\theta(z_t, c) \approx x$ for all t. After using the re-parametrization trick on $z_t = \alpha_t x + \sigma_t \epsilon$, this learned denoising can be represented by an objective function $L_\theta(x, c)$ of the form:

$$L_\theta(x,c)=E_{\epsilon,t}[W_t \| \hat{x}_\theta(\alpha_t x + \sigma_t \epsilon, c) - x \|_2^2]$$

Here, (x, c) are video-input data pairs with $\epsilon \sim N(0, I)$ sampled from a standard normal distribution and $t \sim U(0,1)$ sampled from a uniform distribution over 0 and 1. $W_t$ is a weighting factor that can be used by a DBGNN 120 to influence the quality of estimates for particular values of t. A DBGNN 120 can realize a parametrization that minimizes the objective function $\theta = _\theta \arg\min L_\theta(x, c)$ which generally maximizes the ELBO and therefore the likelihood $p_\theta(x|c)$. Alternatively, the DBGNN 120 can realize a parametrization that minimizes the objective function averaged over all training pairs $\theta = _\theta \arg\min E_{(x, c)}[L_\theta(x, c)]$. The averaged objective function can improve the quality of estimates but at the cost of likelihood. Note, in some implementations, the DBGNN 120 may utilize variations of this objective function and/or incorporate additional loss terms in the objective function, e.g., if the forward process is learned, to emphasize certain features of the training data, emphasize particular examples from the training data, etc.

After learning a suitable parametrization $\theta$, a DBGNN 120 can then generate output videos $\hat{x}$ from latent representations based on conditioning inputs c. The reverse (decoding) process is described by the joint distribution $p_\theta(x, z|c)$ which starts with standard Gaussian noise at $t=1$ and ends with an output video $\hat{x}$ conditioned on c at $t=0$. Noting that $s<t$, the joint distribution can be expressed as:

$$p_\theta(x,z|c)=p_\theta(x,z_s,z_t|c)=p_\theta(x|z_s,c)p_\theta(z_s|z_t,c)p_\theta(z_t|c)$$

$p_\theta(z_t|c)$ is the (reverse) prior distribution of $z_t$ given c that determines how a DBGNN 120 encodes inputs c into latents $z_t$. Due to the noise schedule, the reverse prior distribution converges to a standard normal distribution $p_\theta(z_1|c) = p(z_1) = N(z_1; 0, I)$ at a time of $t=1$ and is therefore unconditioned on c at the start of the reverse process. In a similar vein as the forward process, $p_\theta(z_s|z_t, c)$ is the reverse transition distribution from $z_t$ to $z_s$ given c, while $p_\theta(x|z_t, c)$ is the conditional distribution of x given $z_t$ and c.

The reverse transition distribution can be determined from:

$$p_\theta(z_s|z_t,c)=q(z_s|z_t,x=\hat{x}_\theta(z_t,c))$$

The reverse transition distribution describes how a DBGNN 120 determines a new latent $z_s$ from a given latent $z_t$, conditioned on c, for times $s<t$. In this case, $q(z_s|z_t, x) = q(z_t|z_s)q(z_s|x)/q(z_t|x)$ is the reversed description of the forward process and can be expressed in terms of a normal distribution of the form:

$$q(z_s|z_t,x)=N(z_s;\tilde{\mu}_{s|t}(z_t,x),\tilde{\sigma}_{s|t}^2 I)$$

$\tilde{\mu}_{s|t}(z_t, x)$ is the mean of the reversed description as a function of $z_t$ and x, which can be expressed as:

$$\tilde{\mu}_{s|t}(z_t,x)=\exp(\lambda_t-\lambda_s)(\alpha_s/\alpha_t)z_t+[1-\exp(\lambda_t-\lambda_s)]\alpha_s x$$

$\tilde{\sigma}_{s|t}^2 = [1-\exp(\lambda_t-\lambda_s)]\sigma_s^2$ is the variance of the reversed description.

The conditional distribution $p_\theta(x|z_t, c)$ describes how a DBGNN 120 decodes latents $z_t$ into videos x based on the conditioning input c. After completing the reverse process, the DBGNN 120 may generate an output video $\hat{x}$ from the conditional distribution $p_\theta(x|z_0, c)$ at the final time step t=0. As explained in Section II, a DBGNN 120 can generate an output video $\hat{x}$ from the conditional distribution in a variety of ways, e.g., sampling from the conditional distribution, returning the mean of the conditional distribution, returning the video with the highest probability, using an algorithm to choose from multiple high-probability videos and/or multiple samples of videos, and so on. A DBGNN 120 can also model the conditional distribution in a variety of different ways. However, the conditional distribution of a DBGNN 120 is generally not normally distributed which can make modeling and sampling from it difficult. Various sampling methods that can alleviate this problem are described below. Note, in implementations involving noise conditioning augmentation (e.g., during inference and/or training), the respective input c to each subsequent DBGNN may also include a signal $\lambda'_t = \partial_t \Delta_t$ that controls the strength of the augmentation applied to the subsequent DBGNN's input video.

To sample latents during the reverse process, a DBGNN 120 can use the discrete time ancestral sampler with sampling variances derived from lower and upper bounds on reverse process entropy. Greater detail of the ancestral sampler is provided by Jonathan Ho, Ajay Jain, and Pieter Abbeel, "Denoising Diffusion Probabilistic Models," *NeurIPS*, 2020. Starting at the reverse prior distribution $z_1 \sim N(z_1; 0, I)$ at t=1 and computing transitions with $p_\theta(z_s|z_t, c)$ for times s<t, the ancestral sampler follows the update rule:

$$z_s = \mu_{s|t}(z_t, \hat{x}_\theta(z_t, c)) + \in \sqrt{(\tilde{\sigma}_{s|t}^2)^{1-\gamma}(\sigma_{t|s}^2)^\gamma}$$

$\in$ is standard Gaussian noise, $\gamma$ is a hyperparameter that controls the stochasticity of the sampler and s, t follow a uniformly spaced sequence from 1 to 0. The update rule allows a DBGNN 120 to generate a new latent $z_s$ from the previous latent $z_t$ and the previous estimate $\hat{x}_\theta(z_t, c)$ until $z_0$ is reached, at which point the estimate $\hat{x}_\theta(z_0, c)$ is generated by the DBGNN 120 as the output video $\hat{x} = \hat{x}_\theta(z_0, c)$). This implementation can be particularly efficient, as the DBGNN 120 can sample standard Gaussian noise and directly generate the estimate $\hat{x}_\theta(z_t, c)$ as output, which it can use to determine $z_s$ and repeat the process at the next iteration. As explained in Section VI, this allows the DBGNN 120 to generate estimates $\hat{x}_\theta(z_t, c)$ deterministically from $z_t$ and c, without referencing the reverse transition and conditional distributions directly, facilitating straightforward neural network architectures (e.g., super-resolution models). Hence, the DBGNN 120 can be realized, at least in part, as a neural network that takes $z_t$ and c as input and generates $\hat{x}_\theta(z_t, c)$ as output.

Alternatively to the ancestral sampler, a DBGNN 120 can use the deterministic denoising diffusion implicit model (DDIM) sampler as described by Jiaming Song, Chenlin Meng, and Stefano Ermon, "Denoising diffusion implicit models," arXiv preprint arXiv:2010.02502 (2020). The DDIM sampler is a numerical integration rule for the probability flow ordinary differential equation (ODE) which describes how a sample from a standard normal distribution can be deterministically transformed into a sample from the video data distribution using the denoising model.

In some implementations, the DBGNNs 120 use a v-prediction parametrization during video generation and/or training. In this case, a DBGNN 120 generates an estimate $\hat{v}$ of the auxiliary parameter $v_t = \alpha_t \in -\sigma_t x$ instead of generating estimates $\hat{x}$ of videos x directly. The DBGNN 120 then determines the estimate of a video from the estimate of the auxiliary parameter $\hat{x}_\theta(z_t, c) = \alpha_t z_t - \alpha_t \hat{v}_\theta(z_t, c)$. Estimating v instead of x generally improves numerical stability, as well as supporting computational techniques such as progressive distillation. Progressive distillation is an algorithm that iteratively halves the number of sampling steps over t by distilling a slow teacher diffusion model into a faster student model, which can speed up sampling rates by orders of magnitude. For example, some state-of-the-art samplers can take as many as 8192 sampling steps but can be reduced to as few as 4 or 8 steps when the DBGNNs 120 use progressive distillation. The DDIM sampler can be useful in combination with progressive distillation for fast sampling. Accordingly, the DBGNNs 120 generally use progressive distillation when implementing the v-parametrization. Moreover, for any subsequent DBGNNs that operate at higher resolutions in the sequence 121, the v-parametrization can avoid color shifting artifacts that can affect high resolution diffusion models and it can avoid temporal color shifting that sometimes appears with other parametrizations (e.g., $\in$-parametrizations). A detailed discussion regarding the v-parametrization and progressive distillation for diffusion models is provided by Tim Salimans and Jonathan Ho, "Progressive Distillation for Fast Sampling of Diffusion Models," *ICLR*, 2022. For reference, a weighting factor of $W_t = 1 + \exp(\lambda_t)$ in the abovementioned objective function $L_\theta$ amounts to an equivalent objective for a standard v-parametrization.

In some implementations, the DBGNNs 120 use classifier-free guidance during video generation and/or training. Classifier-free guidance can improve the fidelity of output videos $\hat{x}$ with respect to a given condition input c and amounts to adjusting the estimates $\hat{x} \to \tilde{x}$ using:

$$\tilde{x}_\theta(z_t, c) = (1+\omega)\hat{x}_\theta(z_t, c) - \omega \hat{x}_\theta(z_t)$$

$\omega$ is the guidance weight, $\hat{x}_\theta(z_t, c)$ is the estimate of the conditional model and $\hat{x}_\theta(z_t) = \hat{x}_\theta(z_t, c=0)$ is the estimate of an unconditional model. The training engine can jointly train the unconditional model with the conditional model by dropping out the conditioning input c. Note that the above linear transformation can be equivalently performed in the v-parametrization space as $\tilde{v}_\theta(z_t, c) = (1+\omega)\hat{v}_\theta(z_t, c) - \omega \hat{v}_\theta(z_t)$. For $\omega > 0$ this adjustment has the effect of over-emphasizing the influence of the conditioning input c, which may produce estimates of lower diversity but generally of higher quality compared to the regular conditional model. Classifier-free guidance can be interpreted as a way to guide the estimates towards areas where an implicit classifier $p(c|z_t)$ has high likelihood.

In further implementations, one or more of the DBGNNs 120 can allow $\omega$ to oscillate between a high guidance weight (e.g., about 15) and a low guidance weight (e.g., about 1) at each sampling step t. Specifically, one or more of the DBGNNs 120 can use a constant high guidance weight for a certain number of initial sampling steps, followed by oscillation between high and low guidance weights. This oscillating method can reduce the number of saturation artifacts generated in an output video $\hat{x}$, particularly at low resolution stages in the sequence 121.

In implementations involving a DDIM sampler, progressive distillation, and classifier-free guidance, a DBGNN 120 may also incorporate a stochastic sampler to realize a two-stage distillation approach. For reference, a one-stage progressive distillation approach distills a trained DDIM sampler to a diffusion model that takes many fewer sampling steps, without losing much perceptual quality. At each iteration of the distillation process, the DBGNN 120 distills an N-step DDIM sampler into a new model with N/2-steps. The DBGNN 120 repeats this procedure by halving the sampling steps t each iteration. This one-stage approach was extended to samplers using classifier-free guidance, as well as to a new stochastic sampler, by Chenlin Meng et al., "On distillation of guided diffusion models". arXivpreprint arXiv:2210.03142 (2022). A DBGNN 120 can use a modified two-stage approach for improved video generation. In particular, at the first stage, the DBGNN 120 learns a single diffusion model that matches the combined output from the jointly trained conditional and unconditional diffusion models, where the combination coefficients are determined by the guidance weight. The DBGNN 120 then applies progressive distillation to the single model to produce models involving fewer sampling steps at the second stage. After distillation, the DBGNN 120 uses a stochastic N-step sampler: at each step, the DBGNN 120 first applies one deterministic DDIM update with twice the original step size (i.e., the same step size as a N/2-step sampler), and then performs one stochastic step backward (i.e., perturbed with noise following the forward diffusion process) with the original step size. This stochastic backward stepping is described in more detail by Karras, Tero, et al., "Elucidating the design space of diffusion-based generative models," arXiv preprint arXiv:2206.00364 (2022). Using this approach, a DBGNN 120 can distill down to much fewer sampling steps (e.g., about 8 steps) without any noticeable loss in perceptual quality of output videos.

IV. Text-to-Video Generation (Inference)

Figure 2A:
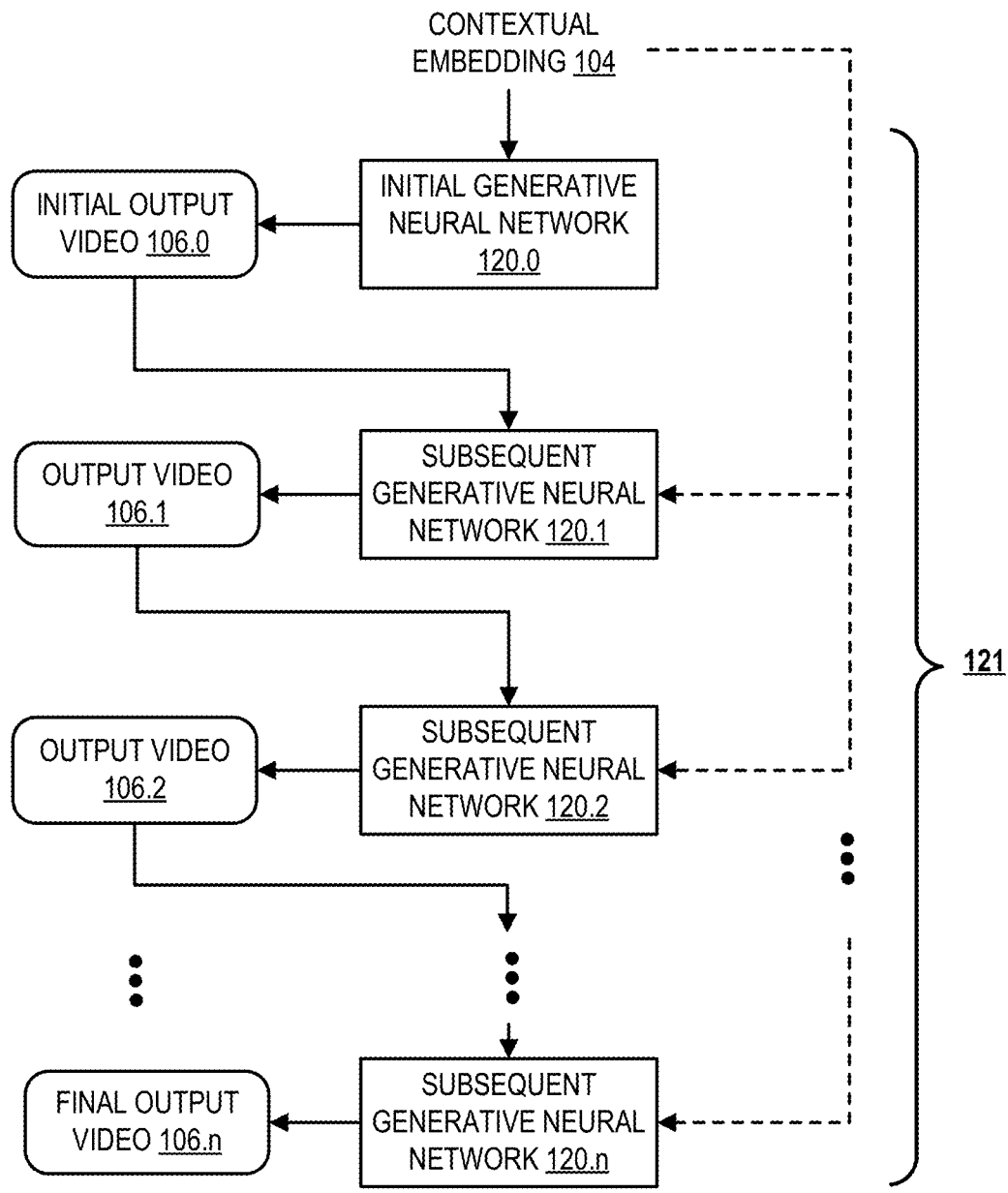
FIG. 2A shows a block diagram of an example sequence of generative neural networks.

FIG. 2A shows a block diagram of an example sequence of GNNs 121. The sequence 121 is an example of a system implemented as computer programs on one or more computers in one or more locations in which the systems, components, and techniques described below are implemented.

The sequence 121 or "cascade" includes multiple GNNs 120.0-n that are each configured to perform a specific step in the processing pipeline. Particularly, the sequence 121 includes an initial GNN 120.0 that generates an initial output video 106.0, followed by one or more subsequent GNNs 120.1-n. The subsequent GNNs 120.1-n progressively refine the resolution of the initial video 106.0 by generating respective output videos 106.i based on received input videos until a final output video 106.n is reached.

The initial GNN 120.0 is configured to receive a contextual embedding 104 of a text prompt 102 as input $c^{(0)}=(u)$. The initial GNN 120.0 is configured to process the input to generate the initial output video ($\hat{x}^{(0)}$) 106.0. The initial video 106.0 has an initial resolution $R^{(0)}=N_x^{(0)} \times N_y^{(0)} \times N^{(0)}$ corresponding to an initial spatial resolution $N_x^{(0)} \times N_y^{(0)}$ and an initial temporal resolution $N^{(0)}$. The initial resolution $R^{(0)}$ also corresponds to the dimensionality of the initial output video 106.0 and is generally of low dimensionality.

As explained in Section II, to generate the initial output video 106.0, the initial GNN 120.0 can sample a latent representation $z^{(0)}$ from its prior distribution $p_\theta(z^{(0)}|c^{(0)})$. The initial GNN 120.0 can then process the latent $z^{(0)}$ to generate the initial output video $\hat{x}^{(0)}$ from its conditional distribution $p_\theta(x^{(0)}|z^{(0)}, c^{(0)})$. For example, the initial GNN 120.0 can sample a video from its conditional distribution, return the mean of its conditional distribution, return the video with the highest probability, or use an algorithm to choose between multiple high-probability videos and/or sampled videos.

In some implementations, the initial GNN 120.0 is a DBGNN. As explained in Section III, the initial DBGNN 120.0 can perform a reversed process starting from t=1 and ending at t=0 to generate the initial output video 106.0. For example, the initial DBGNN 120.0 can sample a latent representation $z_1^{(0)}$ from its (reverse) prior distribution $z_1^{(0)} \sim N(z_1^{(0)}; 0, I)$ at t=1 and continually update the latent $z_s^{(0)}$ at each sampling step using the ancestral sampler. That is, the initial DBGNN 120.0 can process a current latent $z_t^{(0)}$ and generate a current estimate $\hat{x}_\theta(z_t^{(0)}, c^{(0)})$. The initial DBGNN 120.0 can then determine a new latent $z_s^{(0)}$ from the current estimate using the update rule for s<t. The initial DBGNN 120.0 updates the latent until reaching $z_0^{(0)}$ at t=0 and thereafter outputs the corresponding estimate as the initial output video $\hat{x}^{(0)}=\hat{x}_\theta(z_0^{(0)}, c^{(0)})$. In some implementations, the initial DBGNN 120.0 uses one or more of a v-parametrization, progressive distillation, and/or classifier-free guidance when generating the initial output video $\hat{x}(0)$.

Each subsequent GNN 120.i is configured to receive a respective input $c^{(i)}=(\hat{x}^{(i-1)})$ that includes an input video $\hat{x}^{(i-1)}$ generated as output by a preceding GNN in the sequence 121. Each subsequent GNN 120.i is configured to process the respective input to generate a respective output video ($\hat{x}^{(i)}$) 106.i. As explained in Section II, each subsequent GNN 120.i can also apply noise conditioning augmentation to their input video $\hat{x}^{(i-1)}$, e.g., Gaussian noise conditioning. In some implementations, the respective input $c^{(i)}=(\hat{x}^{(i-1)}, u)$ of each subsequent GNN 120.i also includes the contextual embedding 104 of the text prompt 102. The input video $\hat{x}^{(i-1)}$ and output video $\hat{x}^{(i)}$ of each subsequent GNN 120.i has an input resolution $R^{(i-1)}$ and an output resolution $R^{(i)}$, respectively. The output resolution is higher than the input resolution $R^{(i)}>R^{(i-1)}$, in which case, either the spatial resolution is higher $N_x^{(i)} \times N_y^{(i)} > N_x^{(i-1)} \times N_y^{(i-1)}$ the temporal resolution is higher $N^{(i)}>N^{(i-1)}$, or both. Consequently, the resolution of the output videos 106.0-n, and therefore their dimensionality, continually increases $R^{(n)}>R^{(i-1)}> \ldots >R^{(0)}$. Hence, the respective output video $\hat{x}^{(n)}$ 106.n of a final GNN 120.n in the sequence 121 has at least one of, a higher spatial resolution or a higher temporal resolution than the initial output video $\hat{x}^{(0)}$ 106.0, but generally has both a higher spatial resolution and a higher temporal resolution.

As explained in Section II, to generate an output video 106.i, a subsequent GNN 120.i can sample a latent representation $z^{(i)}$ from its prior distribution $p_\theta(z^{(i)}|c^{(i)})$. The subsequent GNN 120.i can then process the latent $z^{(i)}$ to generate the output video $\hat{x}^{(i)}$ from its conditional distribution $p_\theta(x^{(i)}|z^{(i)}, c^{(i)})$. For example, the subsequent GNN 120.i can sample a video from its conditional distribution, return the mean of its conditional distribution, return the video with the highest probability, or use an algorithm to choose between multiple high-probability videos and/or sampled videos.

In some implementations, each subsequent GNN 120.i is a DBGNN. As explained in Section III, a subsequent DBGNN 120.i can perform a reversed process starting from t=1 and ending at t=0 to generate an output video 106.i. For example, the subsequent DBGNN 120.i can sample a latent representation $z_1^{(i)}$ from its (reverse) prior distribution $z_1^{(i)} \sim N(z_1^{(i)}; 0, I)$ at t=1 and continually update the latent $z_s^{(i)}$ at each sampling step using the ancestral sampler. That is, the subsequent DBGNN 120.i can process a current latent $z_t^{(i)}$ and generate a current estimate $\hat{x}\theta(z_t^{(i)}, c^{(i)})$. The subsequent DBGNN 120.i can then determine a new latent $z_s^{(i)}$ from the current estimate using the update rule for s<t. The subsequent DBGNN 120.i updates the latent until reaching $z_0^{(i)}$ at t=0 and thereafter outputs the corresponding estimate as the output video $\hat{x}^{(i)} = \hat{x}_\theta(z_0^{(i)}, c^{(i)})$. In some implementations, the subsequent DBGNN 120.*i* uses one or more of a v-parametrization, progressive distillation, and/or classifier-free guidance when generating their respective output video $\hat{x}^{(i)}$. In implementations involving noise conditioning augmentation, the input $c_t^{(i)} = (\hat{x}^{(i-1)}, u, \lambda'_t)$ of the subsequent DBGNN 120.*i* can also include a signal $\lambda'_t = \partial_t \lambda_t$ that controls the strength of the conditioning augmentation applied to the input video $\hat{x}^{(i-1)}$.

Figure 2B:
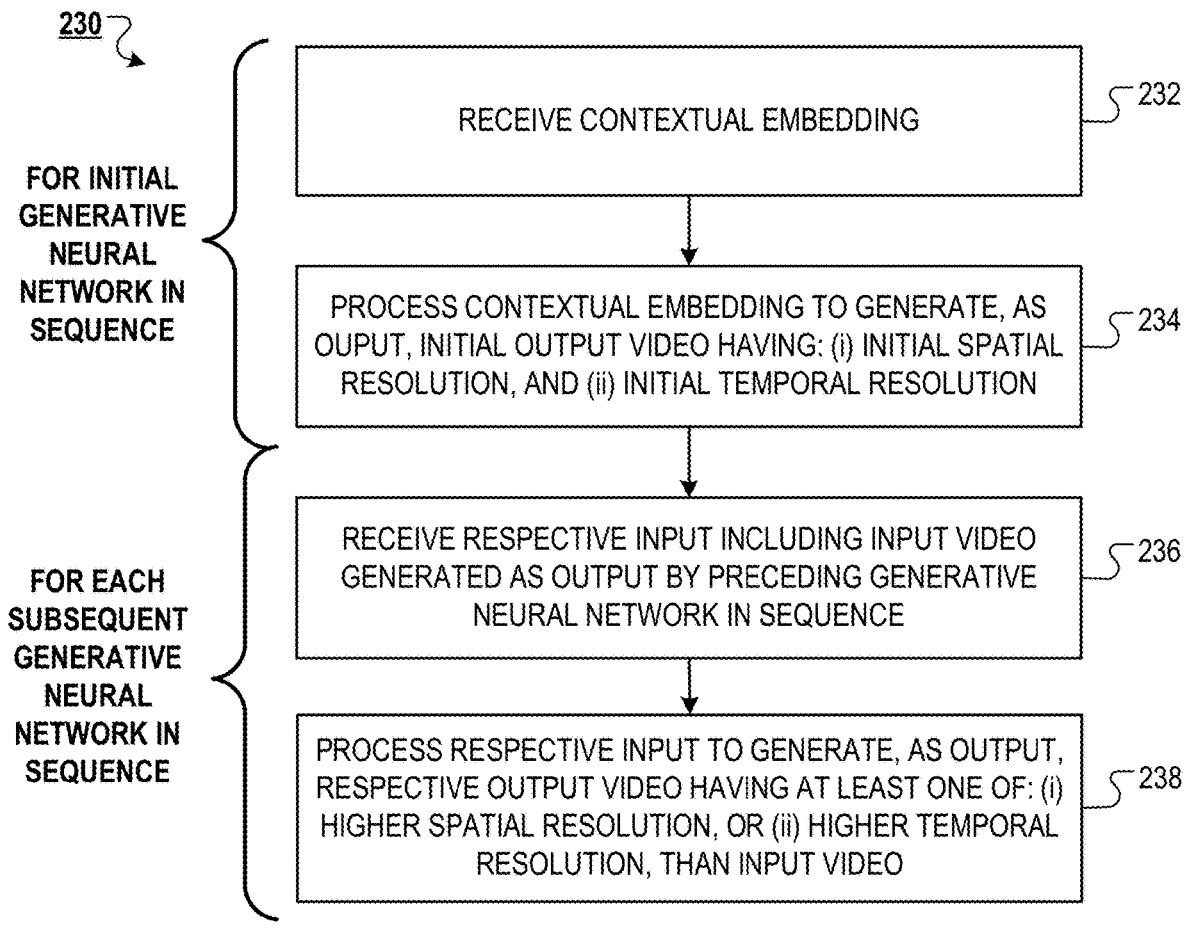
FIG. 2B is a flow diagram of an example process for processing a contextual embedding using a sequence of generative neural networks.

FIG. 2B is a flow diagram of an example process 230 for processing a contextual embedding of a text prompt using a sequence of generative neural networks. For convenience, the process 230 will be described as being performed by a system of one or more computers located in one or more locations. For example, a sequence of generate neural networks, e.g., the sequence of generative neural networks 121 of FIG. 2A, appropriately programmed in accordance with this specification, can perform the process 230.

The sequence of generative neural networks includes an initial generative neural network and one or more subsequent generative neural networks.

The initial generative neural network receives the contextual embedding (232).

The initial generative neural network processes the contextual embedding to generate, as output, an initial output video having: (i) an initial spatial resolution, and (ii) an initial temporal resolution (234).

For each subsequent generative neural network:

The subsequent generative neural network receives a respective input including an input video generated as output by a preceding generative neural network in the sequence (236). In some implementations, the respective input for the subsequent generative neural network further includes the contextual embedding.

The subsequent generative neural network processes the respective input to generate, as output, a respective output video having at least one of: (i) a higher spatial resolution, or (ii) a higher temporal, than the input video (238).

In some implementations, each generative neural network in the sequence is a diffusion-based generative neural network.

V. Text-to-Video Training

Figure 3A:
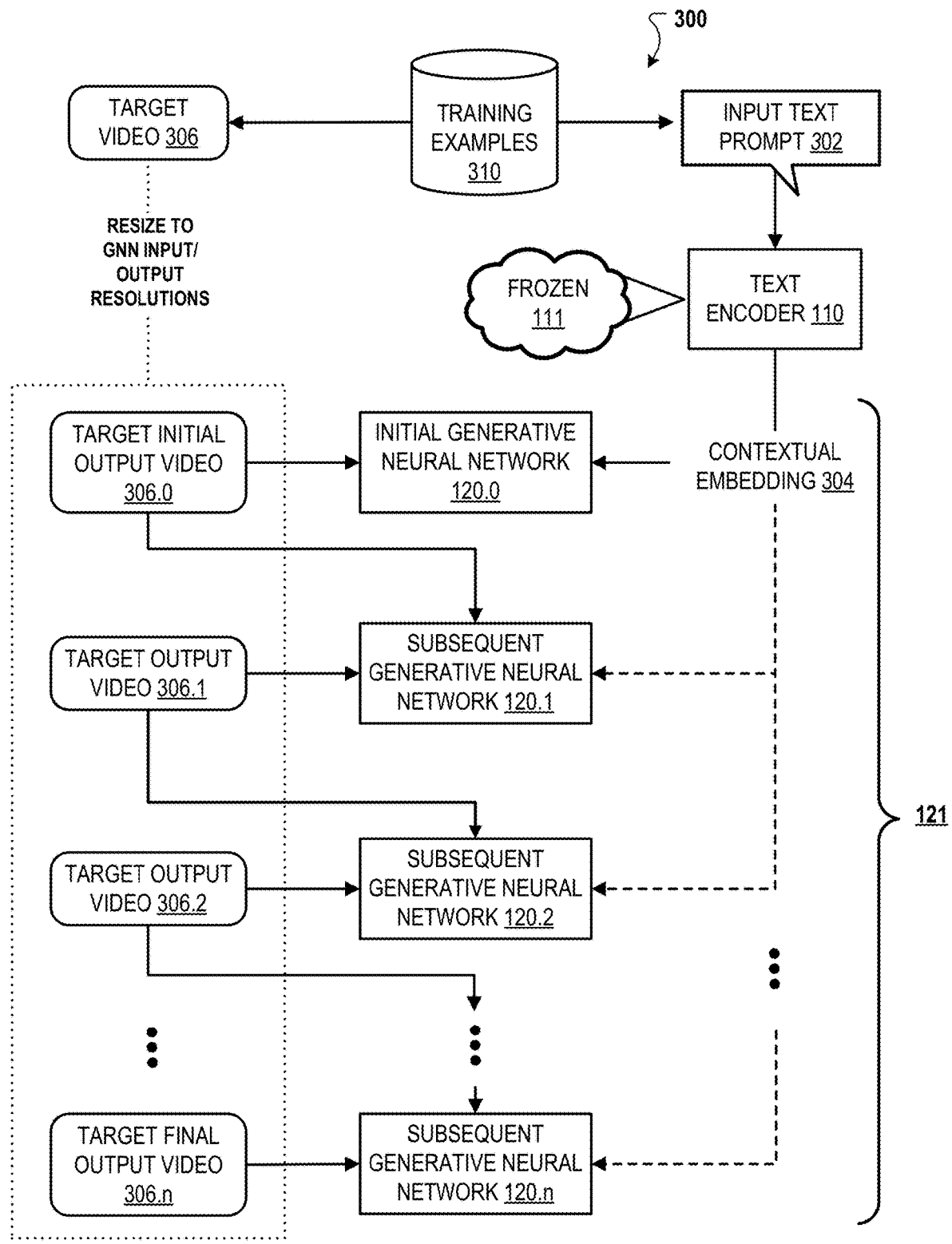
FIG. 3A shows a block diagram of an example training engine that can jointly train a sequence of generative neural networks.

FIG. 3 shows a block diagram of an example training engine 300 that can jointly train a sequence of GNNs 121. The training engine 300 is an example of a system implemented as computer programs on one or more computers in one or more locations in which the systems, components, and techniques described below are implemented.

The training engine 300 obtains multiple training examples 310, for instance, from a publically available training set or any suitably labeled text-video training set. Each training example 310 includes: (i) a respective input text prompt (T) 302 describing a particular scene, and (ii) a corresponding target video (x) 306 depicting the particular scene. The text encoder neural network 110 processes the respective input text prompt 302 of each training example 310 to generate a corresponding contextual embedding (u) 304 of the input text prompt 302. In some implementations, the text encoder 110 is pre-trained and held frozen 111 by the training engine 300 during the joint training of the GNNs 120.0-*n*.

The training engine 300 resizes the target video 306 of each training example 310 to the appropriate input and output resolutions of the GNNs 120.0-*n*. This produces target output videos $\hat{x}^{(i)}$ 306.*i* scaled to the correct resolution $R^{(i)}$ for each GNN 120.*i*. For example, the training engine 300 can resize the target videos x to the appropriate spatial and temporal resolutions of the GNNs 120.0-*n* by spatial resizing and frame skipping. After resizing, the training engine 300 can train each GNN 120.*i* in the sequence 121 in parallel and/or individually.

The training engine 300 trains the initial GNN 120.0 on video-input data pairs of the form $(x^{(0)}, c^{(0)})$. Here, $x^{(0)}$ is a target initial output video 306.0 sized to the initial resolution $R^{(0)}$ of the initial GNN 120.0 and $c^{(0)} = (u)$ is a respective training input that includes the contextual embedding 304 of the corresponding input text prompt 302. For the initial GNN 120.0 to learn an appropriate prior distribution $p_\theta(z^{(0)}|c^{(0)})$ and/or conditional distribution $p_\theta(x^{(0)}|z^{(0)}, c^{(0)})$, the training engine 300 can use an EM algorithm to maximize the likelihood of the data $p_\theta(x^{(0)}|c^{(0)})$ with respect to the initial GNN 120.0's network parameters $\theta^{(0)}$. Alternatively or in addition, the training engine 300 can optimize a suitable objective function $L_\theta(x^{(0)}, c^{(0)})$ with respect to $\theta^{(0)}$ that depends on $x^{(0)}$ and $c^{(0)}$. In some implementations, the training engine 300 introduces a posterior distribution $q_\phi(z^{(0)}|x^{(0)}, c^{(0)})$ for the initial GNN 120.0 and optimizes an appropriate objective function with respect to $\theta^{(0)}$ and $\phi^{(0)}$, e.g., corresponding to the ELBO. When the initial GNN 120.0 is a DBGNN, the training engine 300 can minimize an objective function of the form:

$$L_\theta(x^{(0)}, c^{(0)}) = E_{\in,t}[W_t \| \hat{x}_\theta(\alpha_t x^{(0)} + \sigma_t \in, c^{(0)}) - x^{(0)} \|_2^2]$$

With $\in \sim N(0, I)$ sampled from a standard normal distribution and $t \sim U(0,1)$ sampled from a uniform distribution over 0 and 1. As explained in Section III, the initial DBGNN 120.0 can use one or more of a v-parametrization, progressive distillation, and/or classifier-free guidance during training.

The training engine 300 trains a subsequent GNN 120.*i* on video-input data pairs of the form $(x^{(i)}, c^{(i)})$. Here, $x^{(i)}$ is a target output video 306.*i* sized to the output resolution $R^{(i)}$ of the subsequent GNN 120.*i* and $c^{(i)} = (x^{(i-1)})$ is a training input that includes the target output video $\hat{x}^{(i-1)}$ of a preceding GNN in the sequence 121, sized to its output resolution $R^{(i-1)}$. As explained in Section II, the training engine 300 can also apply noise conditioning augmentation to $x^{(i-1)}$, e.g., Gaussian noise conditioning. In some implementations, the training input $c) = (x^{(i-1)}, u)$ also includes the contextual embedding 306 of the corresponding input text prompt 302. For the subsequent GNN 120.*i* to learn an appropriate prior distribution $p_\theta(z^{(i)}|c^{(i)})$ and/or conditional distribution $p_\theta(x^{(i)}|z^{(i)}, c^{(i)})$, the training engine 300 can use an EM algorithm to maximize the likelihood of the data $p_\theta(x^{(i)}|c^{(i)})$ with respect to the subsequent GNN 120.*i*'s network parameters $\theta^{(i)}$. Alternatively or in addition, the training engine 300 can optimize a suitable objective function $L_\theta(x^{(i)}, c^{(i)})$ with respect to $\theta^{(i)}$ that depends on $x^{(i)}$ and $c^{(i)}$. In some implementations, the training engine 300 introduces a respective posterior distribution $q_\phi(z^{(i)}|x^{(i)}, c^{(i)})$ for the subsequent GNN 120.*i* and optimizes an appropriate objective function with respect to $\theta^{(i)}$ and $\phi^{(i)}$, e.g., corresponding to the ELBO. When the subsequent GNN 120.*i* is a DBGNN, the training engine 300 can minimize an objective function of the form:

$$L_\theta(x^{(i)}, c^{(i)}) = E_{\in,t}[W_t \| \hat{x}_\theta(\alpha_t x^{(i)} + \sigma_t \in, c^{(i)}) - x^{(i)} \|_2^2]$$

With $\in \sim N(0, I)$ sampled from a standard normal distribution and $t \sim U(0,1)$ sampled from a uniform distribution over 0 and 1. As explained in Section III, the subsequent DBGNN 120.*i* can use one or more of a v-parametrization, progressive distillation, and/or classifier-free guidance during training. In implementations involving noise conditioning augmentation, the subsequent DBGNN 120.*i* can also add a signal $\lambda'_t = \partial \lambda_t$ to the training input $c_t^{(i)} = (x^{(i-1)}, u, \lambda'_t)$ that controls the strength of the conditioning augmentation applied to $x^{(i-1)}$.

In some implementations, the training examples 310 include image-based training examples. In these cases, training engine 300 jointly trains the GNNs 120.0-n on the image-based training examples along with the video-based training examples. Particularly, the target output videos 306.0-n associated with an image-based training example can include individual images treated as single frame videos that, for example, each depict a variation of a particular scene described by a corresponding input text prompt 302. The training engine 300 can achieve this by packing individual images into a sequence of the same length as a target output video 306.i and disabling any cross-frame temporal operations performed by the GNNs 120.0-n. For example, training engine can bypass temporal convolution blocks in the GNNs 120.0-n by masking out their computation path. Similarly, training engine 300 can disable any cross-frame temporal attention implemented by the GNNs 120.0-n by applying masking to temporal attention maps. This strategy allows the training engine 300 to train the GNNs 120 on text-image training sets that are significantly larger and more diverse than available text-video training sets. Joint training with images can significantly increase the overall quality of output videos by the GNN 120s. Another aspect of joint training is the knowledge transfer from images to videos. For instance, while training on natural video data enables the GNNs 120.0-n to learn dynamics in natural settings, the GNNs 120.0-n can learn about different image styles (such as sketch, painting, etc.) by training on images, as well as associate them with respect text modifiers in text prompts 302. As a result, this joint training enables the GNNs 120.0-n to generate video dynamics in different styles such as pixel art, the style of Van Gough, watercolor, etc.

Figure 3B:
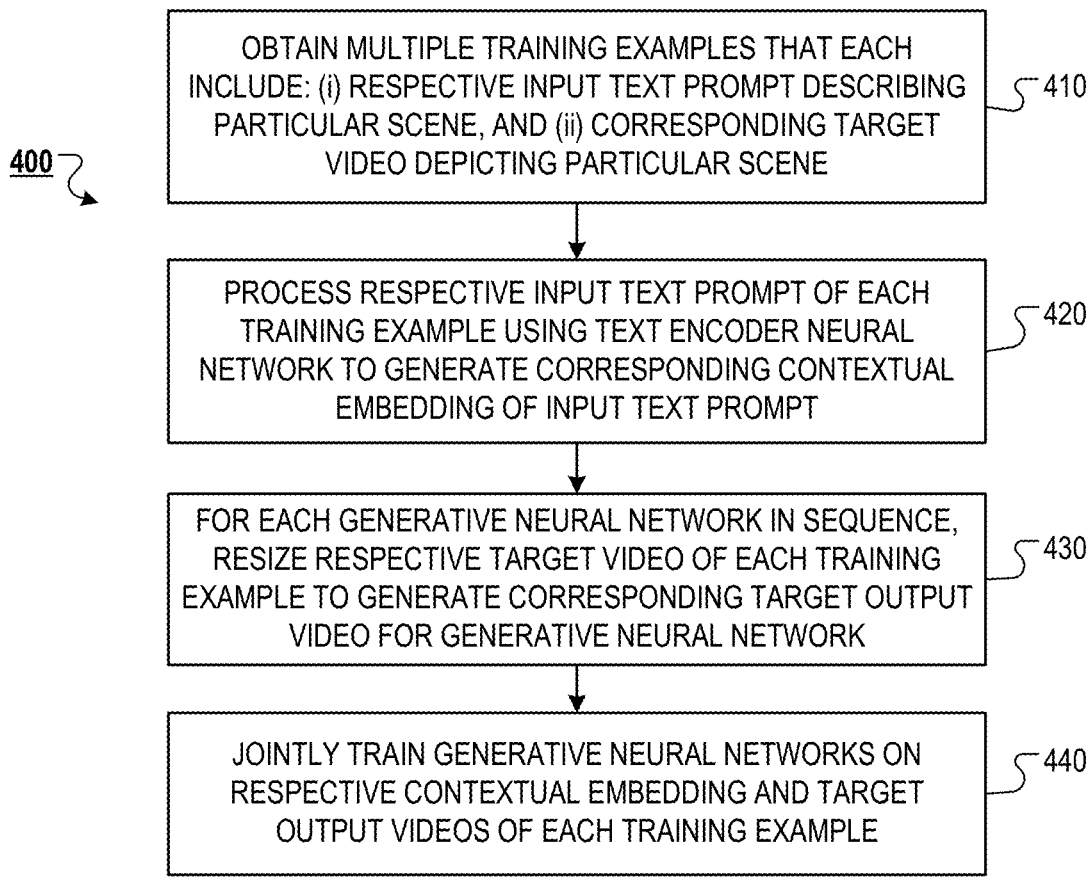
FIG. 3B shows a flow diagram of an example process for jointly training a sequence of generative neural networks.

FIG. 3B is a flow diagram of an example process 400 for jointly training a sequence of generative neural networks. For convenience, the process 400 will be described as being performed by a system of one or more computers located in one or more locations. For example, a training engine, e.g., the training engine 300 of FIG. 3A, appropriately programmed in accordance with this specification, can perform the process 400.

Training engine obtains multiple training examples that each include: (i) a respective input text prompt describing a particular scene, and (ii) a corresponding target video depicting the particular scene (410).

Training engine processes the respective input text prompt of each training example using a text encoder neural network to generate a corresponding contextual embedding of the input text prompt (420). In some implementations, the text encoder neural network is pre-trained and held frozen by the training engine during the joint training of the generative neural networks.

For each generative neural network in the sequence, training engine resizes the respective target video of each training example to generate a corresponding target output video for the generative neural network (430).

Training engine jointly trains the generative neural networks on the respective contextual embedding and target output videos of each training example (440).

In some implementations, the training examples include image-based training examples. The respective target video of each image-based training example can include a respective multiplicity of individual images each depicting a variation of the particular scene described by the respective input text prompt. The training engine can mask out any temporal self-attention and temporal convolution implemented by the generative neural networks while jointly training the generative neural networks on the image-based training examples.

VI. Generative Neural Network (GNN) Architectures

Figures 4A, 4B, 4C:
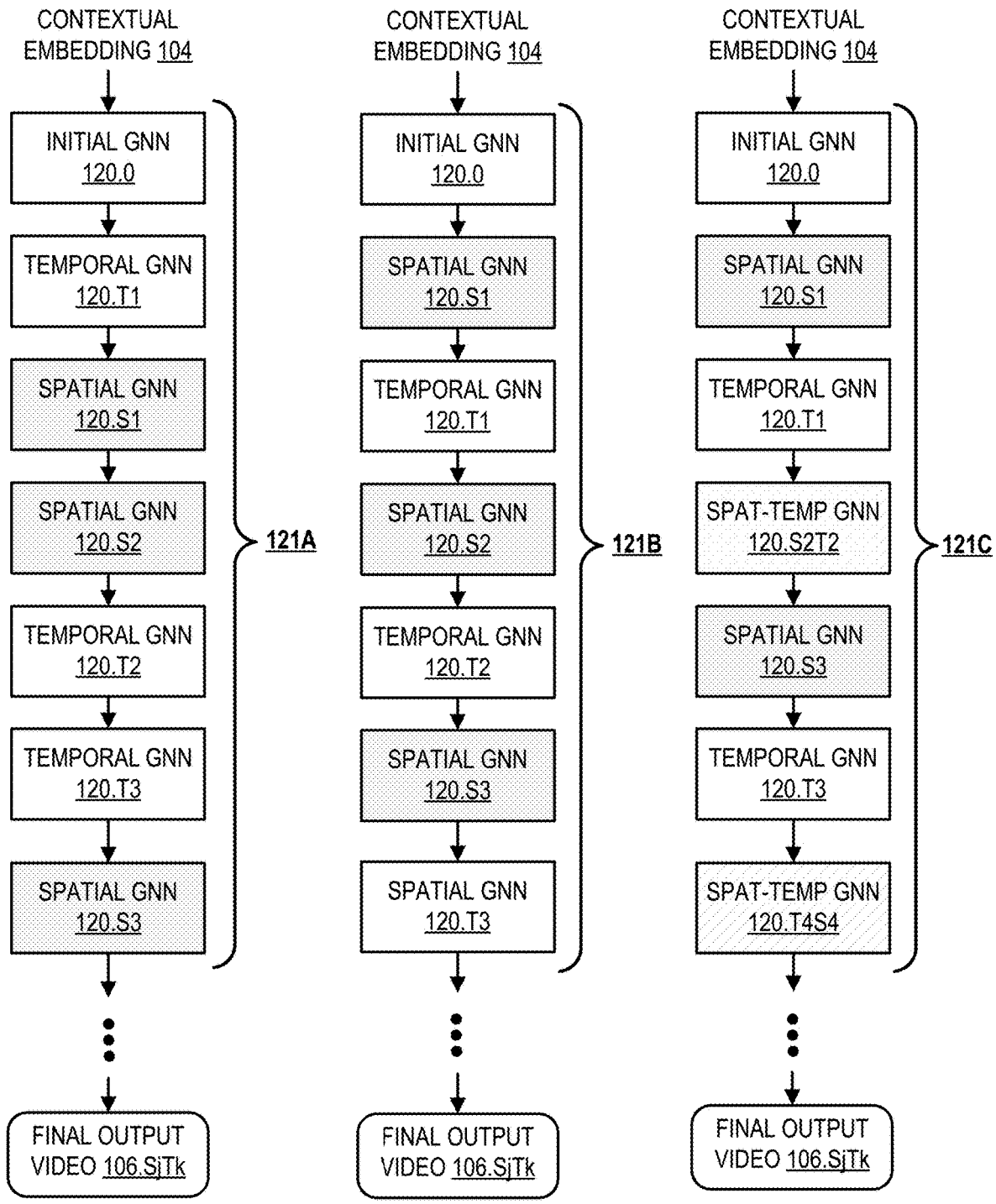
FIGS. 4A-4C show block diagrams of example architectures of a sequence of generative neural networks.

FIGS. 4A-4C show block diagrams of example architectures of a sequence of generative neural networks. Starting from contextual embeddings 104, the example sequences 121A-C generate final output videos 106.SjTk with spatial resolution increased j times and temporal resolution increased k times relative an initial output video. Particularly, each of the sequences 121A-C includes an initial GNN 120.0 employing a base video generation model (to generate the initial video) and one or more subsequent GNNs 120.1-n each employing a super-resolution model to progressively upscale the resolution of the initial video. The super-resolution models can include spatial super-resolution models (SSRs) 120.S, temporal super-resolution models (TSRs) 120.T, and/or joint spatial-temporal super-resolution models (STSRs) 120.ST.

As mentioned in Section II, a GNN 120.i can employ a base video generation model or super-resolution model (deterministically) by modeling its prior distribution as a standard normal distribution and its conditional distribution as a normal distribution. The GNN 120.i can then return the mean video of the conditional distribution as the output video $\hat{x}^{(i)} = \mu_\theta(z^{(i)}, c^{(i)})$. More particularly, the GNN 120.i can be realized as a neural network configured to receive $z^{(i)} \sim N(z^{(i)}; 0, I)$ and $c^{(i)}$ as input and generate frames of the mean video as output $\mu_\theta(z^{(i)}, c^{(i)})$. In some implementations, the GNN 120.i may also model the variance of its conditional distribution. For example, the GNN 120.i can parametrize another neural network in parallel that is configured to receive the same inputs and generate frames of the video variance as output $\sigma_\theta^2(z^{(i)}, c^{(i)})$. The GNN 120.i can then generate output frames of the output video by combining the frames of the mean and variance generated by the two neural networks as $\hat{x}^{(i)} = \mu_\theta(z^{(i)}, c^{(i)}) + \sigma_\theta(z^{(i)}, c^{(i)}) \odot \in$, where $\in \sim N(0, I)$ and $\odot$ is the element-wise product.

As mentioned in Section III, a DBGNN 120.i can be realized as a neural network configured to receive $z_t^{(i)}$ and $c^{(i)}$ as input and generate frames of an estimate as output $\hat{x}_\theta(z_t^{(i)}, c^{(i)})$. Using an update rule (e.g., the ancestral sampler), the DBGNN 120.i can execute this function at each sampling step t of the reverse process to generate output frames of the output video $\hat{x}^{(i)} = \hat{x}_\theta(z_0^{(i)}, c^{(i)})$, at a time step of t=0.

Figure 5A:
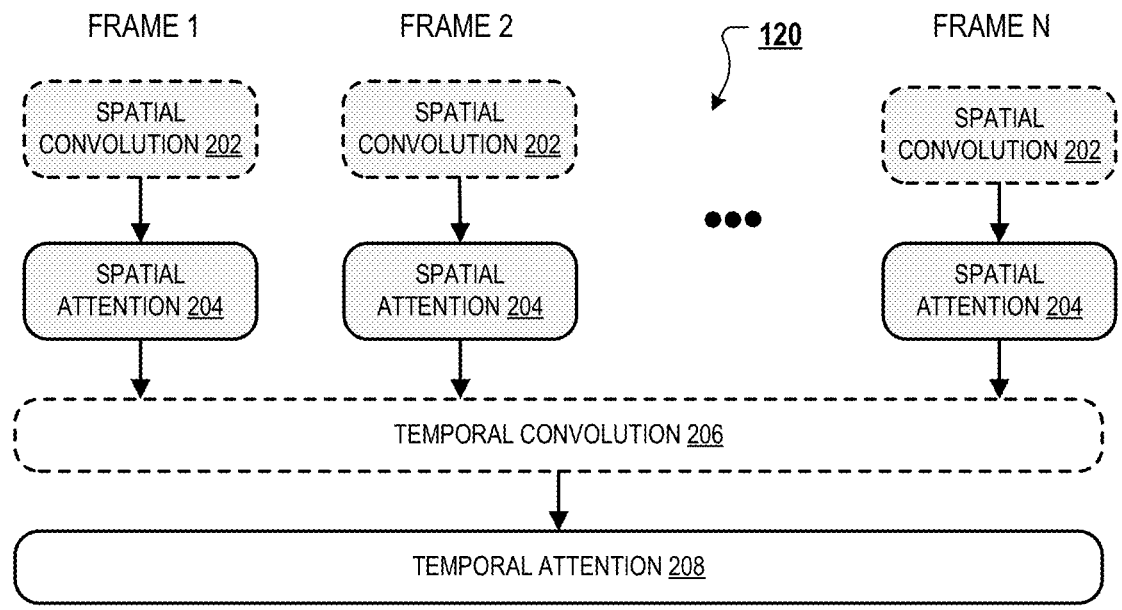
FIGS. 5A-5C show block diagrams of example architectures of generative neural networks.
Figure 5B:
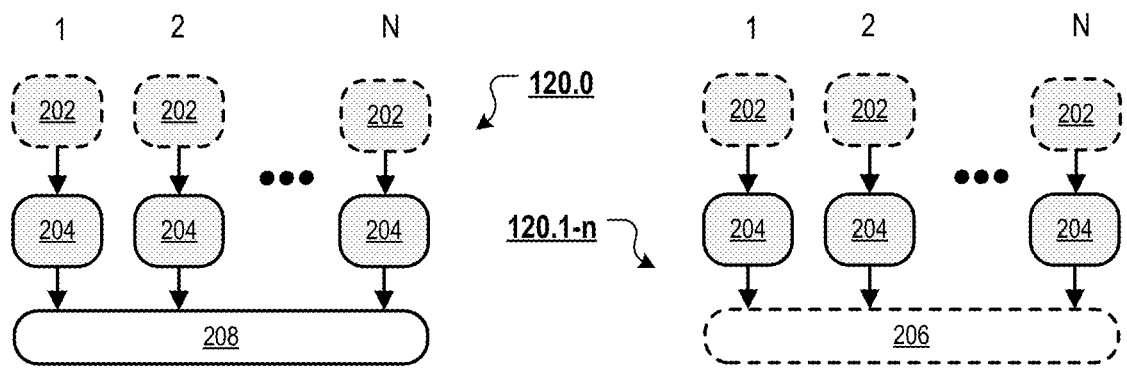
Figure 5C:
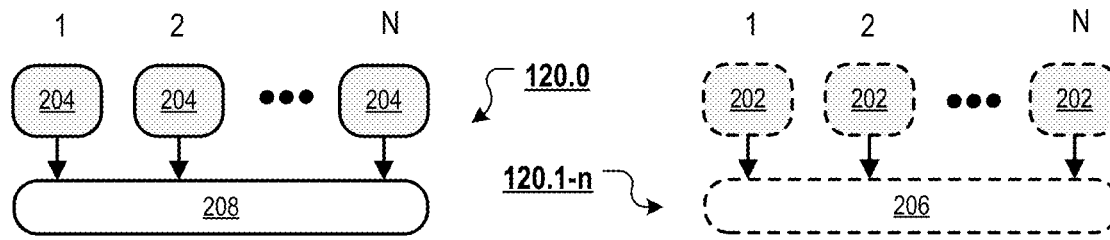

GNNs 120.0-n with any of these neural network configurations can employ the base video generation models and super-resolution models described herein (see FIGS. 5A-5C for particular examples). Note, subsequent GNNs 120.1-n employing super-resolution models can condition on their input videos by spatially and/or temporally up-sampling the input videos and thereafter concatenating channel-wise to the noisy data $z^{(i)}$, or to $z_t^{(i)}$ in the case of DBGNNs. For example, subsequent GNNs 120.1-n can perform spatial up-sampling on input videos using bilinear resizing before concatenation. As another example, subsequent GNNs 120.1-n can perform temporal up-sampling on input videos by repeating frames and/or by filling in blank frames before concatenation.

SSRs 120.S increase the spatial resolution of input videos, TSRs 120.T increase the temporal resolution of input videos, while STSRs 120.ST increase both the spatial and temporal resolution of input videos. For example, the SSRs 120.S can increase the number of independent pixels for all input frames of an input video, while the TSRs 120.T can generate independent frames between input frames of an input video. On the other hand, the STSRs 120.ST can increase the number of independent pixels of all input frames of an input video while also generating independent frames between the input frames. The super-resolution models are general purpose video super-resolution models that can be applied to real videos and/or samples from any type of GNN. Moreover, the GNNs 120.0-$n$ can generate all output frames of their respective output video simultaneously so, for instance, SSRs 120.S and STSRs 120.ST do not suffer from artifacts that would occur from naively running spatial super-resolution on individual frames. Operating on input frames and generating output frames simultaneously can help capture the temporal coherence across the entire length of a final output video 106.SjTk compared to, for example, frame-autoregressive approaches that have generally struggled maintaining temporal coherence.

As seen in FIGS. 4A-4C, various different sequences of GNNs can be implemented by the system 100 to achieve high definition video generation. For example, the sequences 121A and 121B use interleaved SSRs 120.S and TSRs 120.T to upscale the spatial and temporal resolution of input videos in an alternating fashion. Sequence 121A uses a repeating pattern of one TSR 120.T, two SSRs 120.S, two TSRs 120.T, followed by one SSR 120.S. Sequence 121B uses a repeating pattern of one SSR 120.S and one TSR 120.T. As another example, sequence 121C uses a repeating pattern of one SSR 120.S, one TSR 120.T, and one STSR 120.ST.

FIGS. 5A-5C show block diagrams of example architectures of generative neural networks employing a base video generation model or a super-resolution model. As seen in FIG. 5A, a GNN 120 can use any combination of interleaved spatial convolution layers 202, spatial attention layers 204, temporal convolution layers 206, and/or temporal attention layers 208, to capture dependencies between video frames in a space-time separable fashion. Spatial operations 202/204 are performed independently over frames with shared parameters, whereas temporal operations 206/208 are performed over all frames, thereby mixing activations. In some implementations, the GNN 120 uses a Video U-Net architecture, which generalizes the 2D U-Net architecture to 3D. Additional details regarding the Video U-Net architecture is provided by Jonathan Ho et al., "Video diffusion models," arXivpreprint arXiv:2204.03458 (2022).

FIG. 5B shows one example architecture for an initial GNN 120.0 employing a base video generation model and one or more subsequent GNNs 120.1-$n$ employing super-resolution models. The initial GNN 120.0 uses spatial convolution 202, spatial attention 204 and temporal attention 208. On the other hand, for memory efficiency, subsequent GNNs 120.1-$n$ can use spatial convolution 202, spatial attention 204, and temporal convolution 206. In some implementations, the subsequent GNNs operating at the highest spatial resolution do not use spatial attention 204 and are therefore fully convolutional, improving memory efficiency further. The temporal attention 208 in the initial GNN 120.0 enables the sequence 121 to model long term temporal dependencies, while the temporal convolutions 206 in the subsequent GNNs 120.1-$n$ allow the sequence 121 to maintain local temporal consistency during up-sampling. The use of temporal convolutions 206 lowers memory and computation costs over temporal attention 208 and is generally effective for the subsequent GNNs 120.1-$n$ as these components operate at high spatial and temporal resolutions. Moreover, since some amount of temporal correlation is generally present in the conditioning input videos, temporal attention 208 is typically not necessary for the subsequent GNNs 120.1-$n$. The use of spatial attention 204 in the subsequent GNNs 120.1-$n$ can improve sample fidelity but can be dropped out at higher resolutions to reduce memory footprint.

FIG. 5C shows another example architecture for an initial GNN 120.0 employing a base video generation model and one or more subsequent GNNs 120.1-$n$ employing super-resolution models. In this case, the initial GNN 120.0 uses spatial attention 204 and temporal attention 208 and is therefore fully attention-based, while the subsequent GNNs 120.1-$n$ use spatial convolution 202 and temporal convolution 206 and are therefore fully convolutional. This implementation can be particularly fast and has a relatively low memory footprint because the attention layers 204/208 are utilized only by the initial GNN 120.0.

VII. Other Applications

Figure 6A:
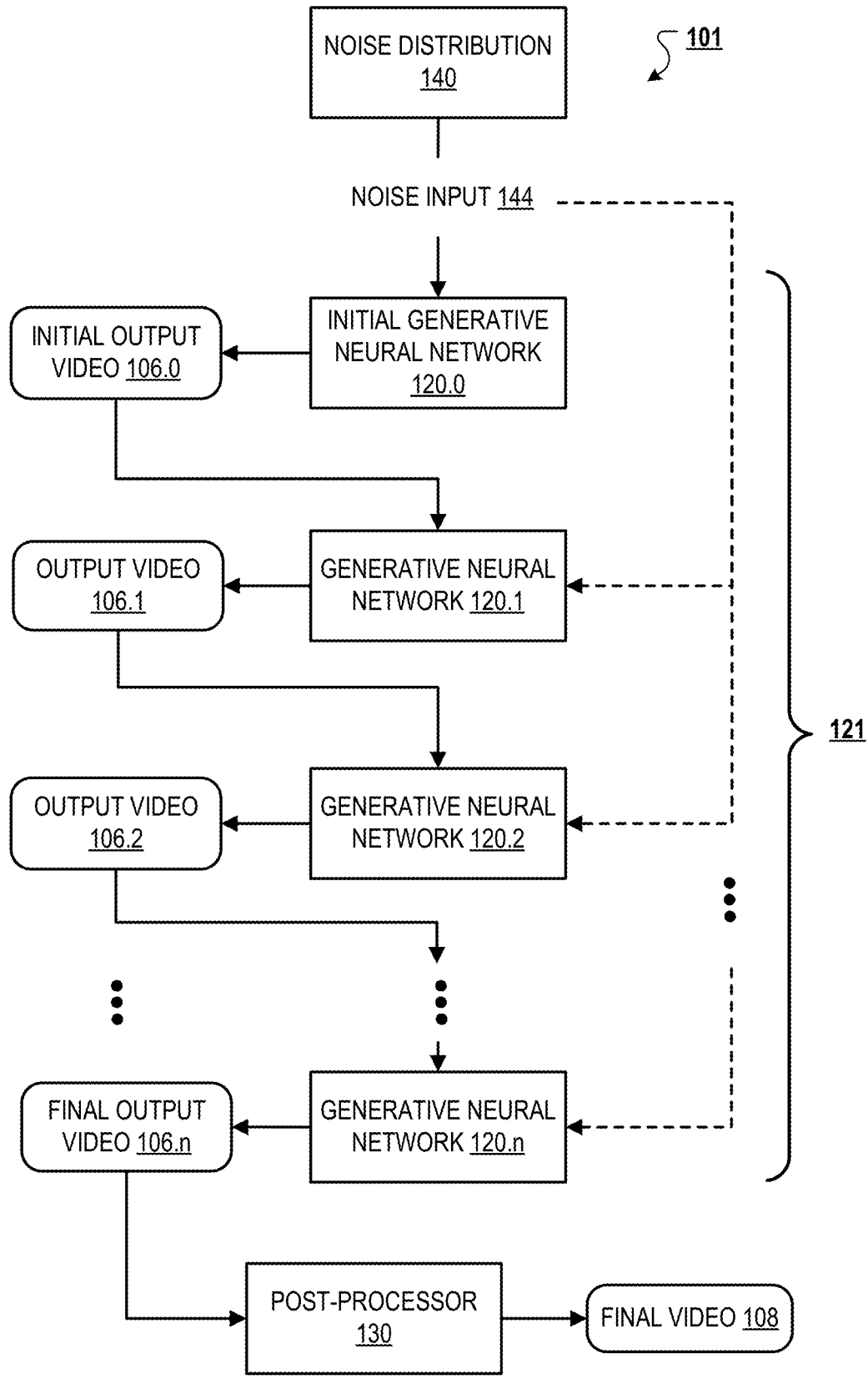
FIG. 6A shows a block diagram of an example video generation system that can generate videos from noise.

FIG. 6A shows a block diagram of an example video generation system 101 that can generate videos from noise. The video generation system 101 is an example of a system implemented as computer programs on one or more computers in one or more locations in which the systems, components, and techniques described below are implemented.

Although this specification is generally directed at text-to-video generation, the video generation systems disclosed herein are not limited to such and can be applied to any conditioned video generation problem. For example, the video generation system 101 shown in FIG. 6A can generate videos from noise which amounts to changing the conditioning input into the video generation system 100 of FIG. 1A, i.e., replacing text prompts 102 with noise inputs 114. In general, the conditioning input can be any desired input such as a pre-existing video, an image, an audio waveform, an embedding of any of these, combination thereof, and so on.

Moreover, the systems disclosed herein can be utilized for applications beyond video generation, in particular, any application involving sequence data generation, i.e., data that is ordered in a manner such that previous data points provide information about later data points. Time series data (e.g., videos) is an example of such sequence data. Sequence data $s=(s_1, s_2, \ldots, s_N)$ has coherence between different elements $s_n$ and when characterized in terms of time evolution is equivalent to temporal coherence. The system is adept at maintaining coherence between elements in any such problem and can be used to generate any form of sequence data with high resolution. Particularly, the sequence of GNNs 121 can be configured to process any form of sequence data by substituting the video data with the sequence data x→s, where each video frame is now an element of the sequence data $x_n \rightarrow s_n$. The same types of GNNs (Sections II and III), methods of inference (Section IV), methods of training (Section V), and GNN architectures (Section VI) can be utilized for generic sequence data. In particular, the SSR, TSR, and STSR models described herein are general purpose models that can be configured to operate on individual sequence elements $s_n$ in the same manner as individual video frames $x_n$.

For example, the initial GNN 120.0 can be configured to receive a conditioning input $c^{(0)}=(u)$. The conditioning input u can be a contextual embedding of a text prompt or any desired conditioning input as mentioned elsewhere herein. The initial GNN 120.0 can be configured to process the input to generate an initial sequence $\hat{s}^{(0)}$ having an initial spatial resolution and an initial temporal resolution. In this case, spatial resolution refers to the resolution (i.e., information or data content) in each element $s_i$ in the sequence $\hat{s}^{(0)}$ and temporal resolution refers to the number of independent elements in the sequence $\hat{s}^{(0)}$. Each subsequent GNN 120.*i* can be configured to receive a respective conditioning input C)=($\hat{s}^{(i-1)}$) that includes an input sequence $\hat{s}^{(i-1)}$ generated as output by a preceding GNN. The respective input $c^{(i)}=(\hat{s}^{(i-1)}, u)$ to each subsequent GNN 120.*i* may also include the conditioning input (u) to the initial GNN 120.0. Each subsequent GNN 120.*i* can be configured to process their respective input to generate a respective output sequence $\hat{s}^{(i)}$ such that the output sequence $\hat{s}^{(i)}$ has at least one of: higher spatial resolution, or higher temporal resolution, than the input sequence $\hat{s}^{(i-1)}$.

In some implementations, the sequence data may be an audio sequence, e.g., multiple audio samples representing an audio waveform. The initial GNN 120.0 can generate an initial sequence of audio samples that each include a number of initial bits. In the case, spatial resolution may refer to the number of bits of an audio sample and temporal resolution may refer to the number of audio samples. Each subsequent GNN 120.*i* can then refine the initial sequence of audio samples to progressively increase the spatial resolution and/or the temporal resolution, thereby increasing the bitrate and/or the sampling rate.

In some implementations, the sequence data may be a sequence of point cloud data, e.g., multiple point clouds of an object representing evolution of the object in an environment. The initial GNN 120.0 can generate an initial sequence of point clouds that each include a number of initial points. In the case, spatial resolution may refer to the number of points of a point cloud and temporal resolution may refer to the number of point clouds. Each subsequent GNN 120.*i* can then refine the initial sequence of point clouds to progressively increase the spatial resolution and/or the temporal resolution, thereby increasing the point cloud density and/or the continuity between point clouds.

In some implementations, the sequence data may be a sequence of protein configuration data, e.g., multiple configurations of a protein representing evolution of the protein with time (e.g., protein folding). The initial GNN 120.0 can generate an initial sequence of protein configurations that each include coordinates of atoms. In this case, spatial resolution may refer to actual spatial resolution of atoms (i.e., how refined their individual positions are) in a configuration and temporal resolution may refer to the number of protein configurations in the sequence. Each subsequent GNN 120.*i* can then refine the initial sequence of protein configurations to progressively increase the spatial resolution and/or the temporal resolution, thereby increasing the spatial resolution of atom coordinates and/or the continuity between configurations.

In some implementations, the sequence data may be a sequence of actions to be performed by an agent, e.g., multiple actions to be performed by the agent to complete a task over a period of time. The initial GNN 120.0 can generate an initial sequence of actions that each include a type of action to be performed. In this case, spatial resolution may refer to the types of actions that can be performed by the agent and temporal resolution may refer to the number of actions in the sequence. Each subsequent GNN 120.*i* can then refine the initial sequence of point clouds to progressively increase the spatial resolution and/or the temporal resolution, thereby increasing the types of actions that can be performed by the agent and/or the continuity between actions.

Referring now to FIG. 6A which shows a video generation system 101 configured to the generate videos from noise. The video generation system 101 can sample a noise input (v) 114 from a noise distribution p(v) 140. For example, the noise distribution 140 can be a binomial distribution, a normal distribution, a Poisson distribution, a Beta distribution, a Kumaraswamy distribution, or any desired probability distribution. The system 101 may sample the noise input 114 in response to a query, such as a user generated or automatically generated query. For example, the system 101 may receive a query to generate a random video and thereafter sample the noise input 114 from the noise distribution 104. The system 101 processes the noise input 114 through a sequence of GNNs 121 to generate a final output video 106.*n* that, in some implementations, is further processed by the post-processor 130 to generate a final video 108. As explained in Section I, the post-processor 130 may apply transformations to the output video 106.*n*, conduct video classification and/or video quality analysis on the output video 106.*n*, etc. In this case, the final video 108 depicts a random scene since the sequence 121 is conditioned on a random noise input 114, as opposed to a text prompt 102 describing a particular scene. However, the final video 108 can still be of high resolution and have strong temporal consistency as long as the sequence 121 is appropriately trained, e.g., by a training engine.

To summarize, the sequence 121 includes an initial GNN 120.0 and one or more subsequent GNNs **120.1-*n*. The initial GNN 120.0 is configured to receive the noise input 114 as a conditioning input $c^{(0)}=(v)$. The initial GNN 120.0 is configured to process the conditioning input to generate an initial output video $(\hat{x}^{(0)})$ 106.0. The initial video 106.0 has an initial resolution $R^{(0)}=N^{(0)} \times N_x^{(0)} \times N_y^{(0)}$ corresponding to an initial spatial resolution $N_x^{(0)} \times N_y^{(0)}$ and an initial temporal resolution $N^{(0)}$. Each subsequent GNN 120**.*i* is configured to receive a respective input $c^{(i)}=(\hat{x}^{(i-1)})$ that includes an input video $\hat{x}^{(i-1)}$ generated as output by a preceding GNN in the sequence 121. Each subsequent GNN 120.*i* is configured to process the respective input to generate a respective output video $(\hat{x}^{(i)})$ 106.*i*. In some implementations, the respective input of each subsequent GNN 120.*i* also includes the noise input $c^{(i)}=(x^{(i-1)}, v)$. The input video $\hat{x}^{(i)}$ and output video $\hat{x}$ of each subsequent GNN 120.*i* has an input resolution $R^{(i-1)}$ and an output resolution $R^{(i)}$, respectively. The output resolution is higher than the input resolution $R^{(i)}>R^{(i-1)}$, in which case, either the spatial resolution is higher $N_x^{(i)} \times N_y^{(i)} > N_x^{(i-1)} \times N_y^{(i-1)}$, the temporal resolution is higher $N^{(i)}>N^{(i-1)}$, or both. The GNNs **120.0-*n* can utilize any of the techniques described in Section II to generate output videos $\hat{x}^{(i)}$ based on conditioning inputs $c^{(i)}$, as well as any of the techniques described in Section III when the GNNs 120.0-*n* are DBGNNs. The GNNs 120.0-*n*** can also utilize any of the neural network architectures described in Section VI.

A training engine (e.g., the training engine 300 of FIG. 3A) can train the sequence 121 to generate output videos $\hat{x}$ from noise in a similar manner as a text. Training involves only slight modifications to the training regime outlined in FIG. 3A since the training set generally includes unlabeled videos as opposed to labelled text-video pairs. That being said, the training engine can train the sequence 121 of system 101 on a very large set of videos since the videos do not need to be labelled. For example, the training engine can obtain videos from large public databases, e.g., YouTube, TikTok, Instagram, etc.

In this case, the training engine can sample pairs of target videos and noise inputs jointly from a joint distribution (x, v)~p(x, v). The joint distribution p(x, v)=p(x|v)p(v) describes the statistics of the data. Here, p(v) is the noise distribution 140 and p(x|v) is the likelihood of x given v. The likelihood can be modelled by the training engine in a variety of ways to associate randomly sampled noise inputs v with target videos x. For example, the training engine may model the likelihood as a normal distribution $p(x|v)=N(x; \mu(v), \Sigma(v))$ such that x is localized around $\mu(v)$ and highly correlated with v. After sampling data pairs (x, v), the training engine can then resize the sampled target videos x to the appropriate input and output resolutions of the GNNs 120.0-$n$.

The training engine can train the initial GNN 120.0 on sampled video-input pairs of the form $(x^{(0)}, c^{(0)})$. Here, $x^{(0)}$ is a target initial output video sized to the initial resolution $R^{(0)}$ of the initial GNN 120.0 and $c^{(0)}=(v)$ is a respective training input that includes the corresponding noise input. The training engine can train a subsequent GNN 120.$i$ on sampled video-input pairs of the form $(x^{(i)}, c^{(i)})$. Here, $x^{(i)}$ is a target output video sized to the output resolution $R^{(i)}$ of the subsequent GNN 120.$i$ and $c^{(i)}=(x^{(i-1)})$ is a training input that includes the target output video $\hat{x}^{(i-1)}$ of a preceding GNN in the sequence 121, sized to its output resolution $R^{(i-1)}$. In some implementations, the training input $c^{(i)}=(x^{(i-1)},v)$ also includes the corresponding noise input. The training engine can use any of the techniques described in Section II to train the sequence 121 on video-input data pairs, as well as any of the techniques described in Section III when the GNNs 120.0-$n$ are DBGNNs.

Figures 6B, 6C:
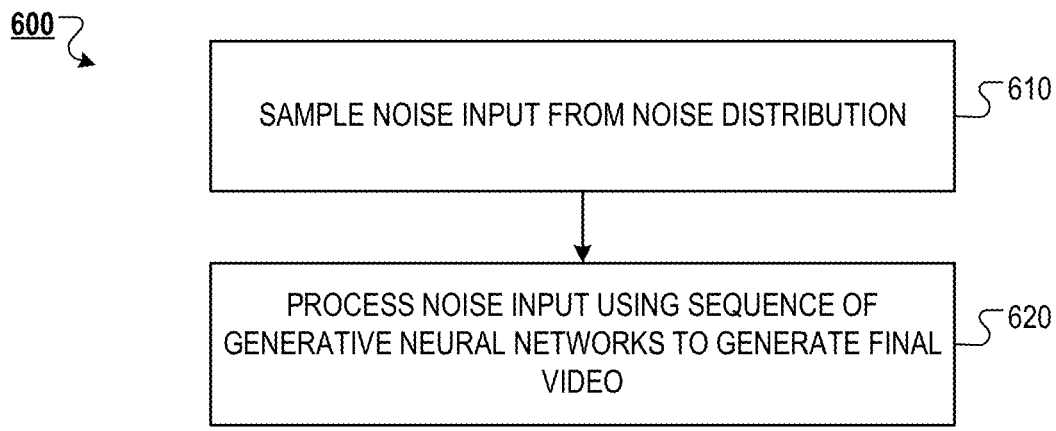
FIG. 6B is a flow diagram of an example process for generating a video from noise.
FIG. 6C is a flow diagram of an example process for processing a noise input using a sequence of generative neural networks.
Figure 7A:
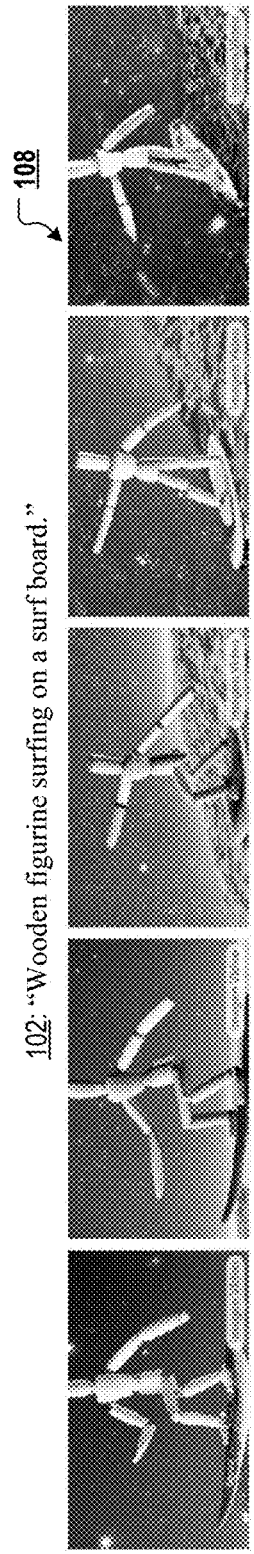
FIGS. 7A-7F show various videos generated from text prompts by a video generation system.
Figure 7B:
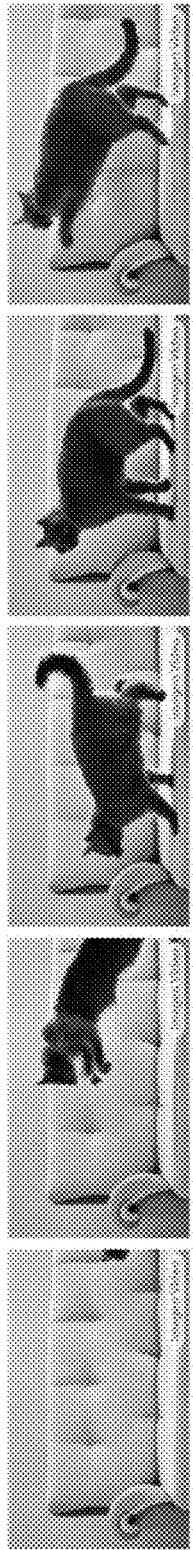
Figure 7C:
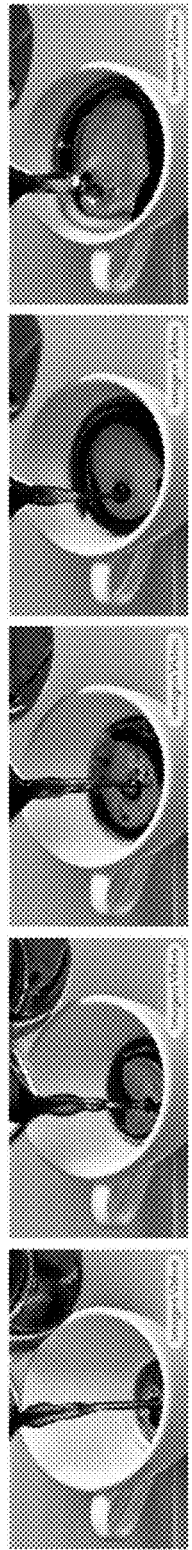
Figure 7D:
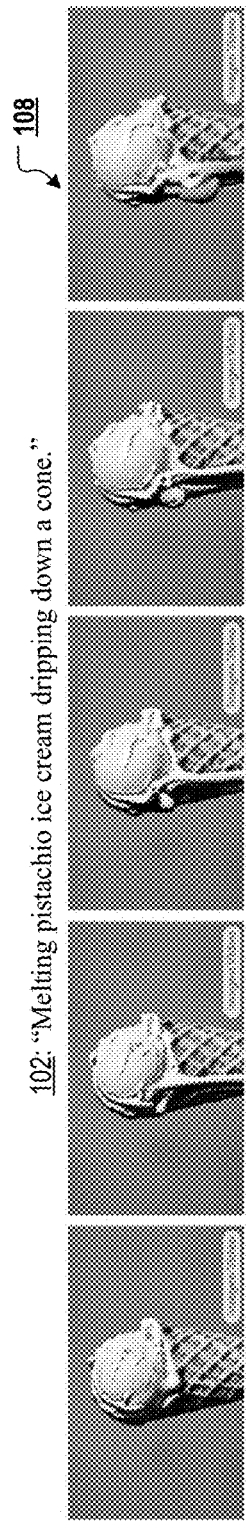
Figure 7E:
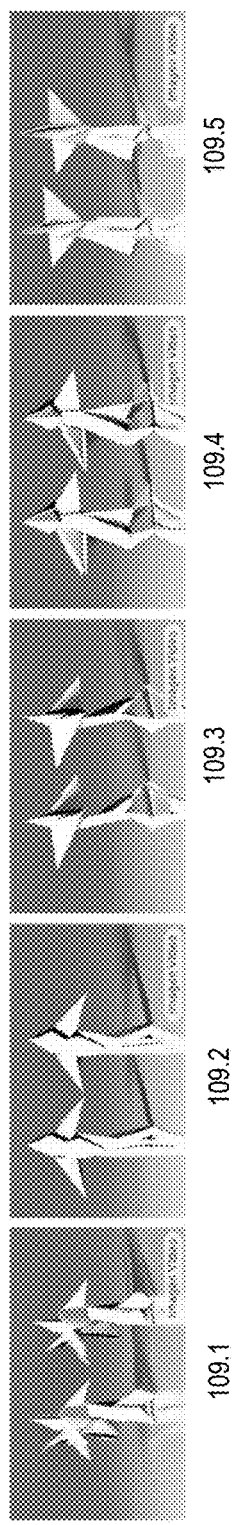
Figure 7F:
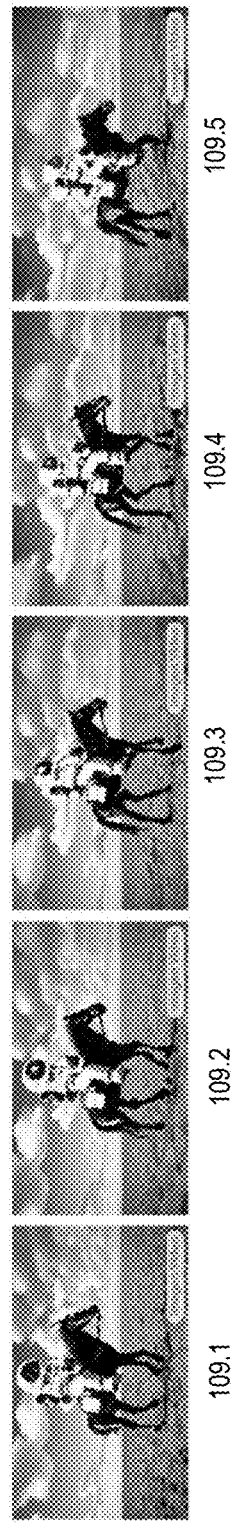

FIG. 6B is a flow diagram of an example process for generating a video from noise. For convenience, the process 600 will be described as being performed by a system of one or more computers located in one or more locations. For example, a video generation system 101, e.g., the video generation system 101 of FIG. 6A, appropriately programmed in accordance with this specification, can perform the process 600.

The system samples a noise input from a noise distribution (610).

The system processes the noise input using a sequence of generative neural networks to generate a final video (620).

FIG. 6C is a flow diagram of an example process for generating a video from noise using a sequence of generative neural networks. For convenience, the process 620 will be described as being performed by a system of one or more computers located in one or more locations. For example, a sequence of generative neural networks, e.g., the sequence of generative neural networks 121 of FIG. 6A, appropriately programmed in accordance with this specification, can perform the process 620.

The sequence of generative neural networks includes an initial generative neural network and one or more subsequent generative neural networks.

The initial generative neural network receives the noise input (622).

The initial generative neural network processes the noise input to generate, as output, an initial output video having: (i) an initial spatial resolution, and (ii) an initial temporal resolution (624).

For each subsequent generative neural network:

The subsequent generative neural network receives a respective input including an input video generated as output by a preceding generative neural network in the sequence (626). In some implementations, the respective input for the subsequent generative neural network further includes the noise input.

The subsequent generative neural network processes the respective input to generate, as output, a respective output video having at least one of: (i) a higher spatial resolution, or (ii) a higher temporal, than the input video (628).

In some implementations, each generative neural network in the sequence is a diffusion-based generative neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are correspond toed in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes correspond toed in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a text prompt describing a scene;
   processing the text prompt using a text encoder neural network to generate a contextual embedding of the text prompt; and
   processing the contextual embedding using a sequence of generative neural networks to generate a final video depicting the scene, wherein the sequence of generative neural networks comprises:
   an initial generative neural network configured to:
      receive the contextual embedding; and
      process the contextual embedding to generate, as output, an initial output video having: (i) an initial spatial resolution, and (ii) an initial temporal resolution; and
   one or more subsequent generative neural networks each configured to:
      receive a respective input comprising an input video generated as output by a preceding generative neural network in the sequence; and
      process the respective input to generate, as output, a respective output video having at least one of: (i) a higher spatial resolution, or (ii) a higher temporal resolution, than the input video,
   wherein the generative neural networks have been jointly trained on training data comprising a plurality of training examples that each include: (i) respective input text describing a respective scene, and (ii) a corresponding target video depicting the respective scene,
   wherein the training examples include image-based training examples,
   wherein the respective target video of each image-based training example comprises a respective plurality of individual images each depicting the respective scene described by the corresponding input text, and
   wherein jointly training the generative neural networks on the image-based training examples comprised masking out any temporal self-attention and temporal convolution implemented by the generative neural networks.

2. The method of claim 1, wherein the respective input of each subsequent generative neural network further comprises the contextual embedding.

3. The method of claim 1, wherein:
   the one or more subsequent generative neural networks comprise a plurality of subsequent generative neural networks, and
   the respective output video of one or more of the plurality of subsequent generative neural networks has one of: (i) a higher spatial resolution, or (ii) a higher temporal resolution, than the input video.

4. The method of claim 3, wherein the respective output video of each of the plurality of subsequent generative neural networks has one of: (i) a higher spatial resolution, or (ii) a higher temporal resolution, than the input video.

5. The method of claim 4, wherein the output videos of the plurality of subsequent generative neural networks alternate between having: (i) a higher spatial resolution, and (ii) a higher temporal resolution, than the input videos.

6. The method of claim 1, wherein video frames of each output video are generated simultaneously by their respective generative neural network.

7. The method of claim 1, wherein the text encoder neural network is pre-trained and was held frozen during the joint training of the generative neural networks.

8. The method of claim 1, wherein:
   the initial generative neural network implements spatial self-attention and temporal self-attention, and
   each subsequent generative neural network implements spatial convolution and temporal convolution.

9. The method of claim 8, wherein:
   the initial generative neural network further implements spatial convolution, and
   each subsequent generative neural network that is not a final generative neural network in the sequence further implements spatial self-attention.

10. The method of claim 1, wherein each generative neural network in the sequence is a diffusion-based generative neural network.

11. The method of claim 10, wherein the diffusion-based generative neural networks are trained using classifier-free guidance.

12. The method of claim 10, wherein each diffusion-based generative neural network uses a v-prediction parametrization to generate the respective output video.

13. The method of claim 12, wherein each diffusion-based generative neural network further uses progressive distillation to generate the respective output video.

14. The method of claim 1, wherein each subsequent generative neural network applies noise conditioning augmentation on the input video.

15. The method of claim 1, wherein the final video is the respective output video of a final generative neural network in the sequence.

16. The method of claim 1, wherein the initial spatial resolution of the initial output video corresponds to an initial per frame pixel resolution, with higher spatial resolutions corresponding to higher per frame pixel resolutions.

17. The method of claim 1, wherein the initial temporal resolution of the initial output video corresponds to an initial framerate, with higher temporal resolutions corresponding to higher framerates.

18. A system comprising one or more computers and one or more storage devices storing instructions that, when executed by the one or more computers, cause the one or more computers to perform operations comprising:
   receiving a text prompt describing a scene;
   processing the text prompt using a text encoder neural network to generate a contextual embedding of the text prompt; and
   processing the contextual embedding using a sequence of generative neural networks to generate a final video depicting the scene, wherein the sequence of generative neural networks comprises:

an initial generative neural network configured to:
receive the contextual embedding; and
process the contextual embedding to generate, as output, an initial output video having: (i) an initial spatial resolution, and (ii) an initial temporal resolution; and
one or more subsequent generative neural networks each configured to:
receive a respective input comprising an input video generated as output by a preceding generative neural network in the sequence; and
process the respective input to generate, as output, a respective output video having at least one of: (i) a higher spatial resolution, or (ii) a higher temporal resolution, than the input video,
wherein the generative neural networks have been jointly trained on training data comprising a plurality of training examples that each include: (i) respective input text describing a respective scene, and (ii) a corresponding target video depicting the respective scene,
wherein the training examples include image-based training examples,
wherein the respective target video of each image-based training example comprises a respective plurality of individual images each depicting the respective scene described by the corresponding input text, and
wherein jointly training the generative neural networks on the image-based training examples comprised masking out any temporal self-attention and temporal convolution implemented by the generative neural networks.

19. One or more non-transitory computer storage media storing instructions that when executed by one or more computers cause the one or more computers to perform operations comprising:
receiving a text prompt describing a scene;
processing the text prompt using a text encoder neural network to generate a contextual embedding of the text prompt; and
processing the contextual embedding using a sequence of generative neural networks to generate a final video depicting the scene, wherein the sequence of generative neural networks comprises:
an initial generative neural network configured to:
receive the contextual embedding; and
process the contextual embedding to generate, as output, an initial output video having: (i) an initial spatial resolution, and (ii) an initial temporal resolution; and
one or more subsequent generative neural networks each configured to:
receive a respective input comprising an input video generated as output by a preceding generative neural network in the sequence; and
process the respective input to generate, as output, a respective output video having at least one of: (i) a higher spatial resolution, or (ii) a higher temporal resolution, than the input video,
wherein the generative neural networks have been jointly trained on training data comprising a plurality of training examples that each include: (i) respective input text describing a respective scene, and (ii) a corresponding target video depicting the respective scene,
wherein the training examples include image-based training examples,
wherein the respective target video of each image-based training example comprises a respective plurality of individual images each depicting the respective scene described by the corresponding input text, and
wherein jointly training the generative neural networks on the image-based training examples comprised masking out any temporal self-attention and temporal convolution implemented by the generative neural networks.

20. The method of claim 1, wherein, for each image-based training example, the respective plurality of individual images each depict a variation of the respective scene described by the corresponding input text.

* * * * *